(12) United States Patent
Teramoto

(10) Patent No.: US 9,499,713 B2
(45) Date of Patent: Nov. 22, 2016

(54) RESIN PARTICLE AGGREGATE, METHOD FOR MANUFACTURING SAME AND APPLICATION OF SAME

(75) Inventor: Kenzo Teramoto, Tokyo (JP)

(73) Assignee: Sekisui Plastics Co., Ltd., Osaka-shi (JP)

( * ) Notice: Subject to any disclaimer, the term of this patent is extended or adjusted under 35 U.S.C. 154(b) by 345 days.

(21) Appl. No.: 14/241,572

(22) PCT Filed: Aug. 31, 2011

(86) PCT No.: PCT/JP2011/069764
§ 371 (c)(1),
(2), (4) Date: Feb. 27, 2014

(87) PCT Pub. No.: WO2013/030977
PCT Pub. Date: Mar. 7, 2013

(65) Prior Publication Data
US 2015/0005437 A1    Jan. 1, 2015

(51) Int. Cl.
| | | |
|---|---|---|
| *C08L 25/06* | (2006.01) | |
| *C08L 33/08* | (2006.01) | |
| *C08L 33/12* | (2006.01) | |
| *C09D 133/12* | (2006.01) | |
| *C08F 2/18* | (2006.01) | |
| *C09D 125/06* | (2006.01) | |
| *C09D 133/08* | (2006.01) | |
| *C08F 2/22* | (2006.01) | |
| *C08F 212/08* | (2006.01) | |
| *C08F 212/36* | (2006.01) | |

(52) U.S. Cl.
CPC ............ *C09D 133/12* (2013.01); *C08F 2/18* (2013.01); *C08F 2/22* (2013.01); *C08L 25/06* (2013.01); *C08L 33/08* (2013.01); *C08L 33/12* (2013.01); *C09D 125/06* (2013.01); *C09D 133/08* (2013.01); *C08F 212/08* (2013.01); *C08F 212/36* (2013.01); *C08L 2312/00* (2013.01)

(58) Field of Classification Search
CPC ............... C09D 133/12; C09D 125/06; C09D 133/06; C08L 25/06; C08L 33/12; C08L 33/08
USPC .................................................. 524/523, 515
See application file for complete search history.

(56) References Cited

U.S. PATENT DOCUMENTS

| 2005/0043458 A1 | 2/2005 | Adamo et al. |
| 2008/0269447 A1 | 10/2008 | Shirai et al. |

FOREIGN PATENT DOCUMENTS

| CN | 101490138 A | | 7/2009 |
|---|---|---|---|
| EP | 1201692 A1 | | 5/2002 |
| EP | 1862478 A1 | | 12/2007 |
| JP | 58-074724 A | | 5/1983 |
| JP | 2000-053720 A | | 2/2000 |
| JP | 2003-012733 A | | 1/2003 |
| JP | 2003012733 A | * | 1/2003 |
| JP | 2004-204164 A | | 7/2004 |
| JP | 2005-068398 A | | 3/2005 |
| JP | 2005068398 A | * | 3/2005 |
| JP | 2009-161600 A | | 7/2009 |
| JP | 2010-116445 A | | 5/2010 |
| JP | 2010-138365 A | | 6/2010 |
| JP | 5478066 B2 | | 4/2014 |
| WO | WO-2004/009649 A1 | | 1/2004 |

* cited by examiner

*Primary Examiner* — Kelechi Egwim
(74) *Attorney, Agent, or Firm* — Locke Lord LLP

(57) ABSTRACT

A resin particle aggregate is the resin particle aggregate formed by aggregating a plurality of resin particles including a polymer of a vinyl monomer, includes 100 parts by mass of the resin particles and 1 to 5 parts by mass of a surfactant. The resin particles are cross-linked by a cross-linkable monomer in an amount of 10 to 50% by mass relative to the total mass of the resin particles, the resin particle aggregate contains an inorganic component in an amount of 0.5% by mass or less, the resin particles have a volume average particle diameter D1, particles contained in a dispersion liquid of the resin particle aggregate in water have a volume average particle diameter D2, and the ratio of D2/D1 is 15 or less.

14 Claims, 2 Drawing Sheets

RESIN PARTICLE AGGREGATE, METHOD FOR MANUFACTURING SAME AND APPLICATION OF SAME

TECHNICAL FIELD

The present invention relates to a resin particle aggregate formed by aggregating a plurality of resin particles including a polymer of a vinyl monomer, for example, a resin particle aggregate that can be suitably used as a light diffusing agent constituting light diffusible members such as a light diffusion plate used as a component of a liquid crystal display, an optical film (for example, an antiglare film and a light diffusion film), and a lighting cover and relates to a method for producing the resin particle aggregate and applications of the resin particle aggregate (to a light diffusible resin composition, a composition for coating, an optical film, and an external preparation).

BACKGROUND ART

Conventionally, acrylic cross-linked resin particles and styrenic cross-linked resin particles have been typically used as a light diffusing agent contained in light diffusible members such as a lighting cover and a light diffusion film and a light diffusion plate for a liquid crystal display; a flatting agent for coating material; and other agents. In order to impart functions such as a light diffusion function and a flatting function to these resin particles that are to be mixed in a light diffusion film or to be used as a flatting agent for coating material, the resin particles are dispersed in a binder resin solution to prepare a dispersion liquid, and the dispersion liquid is applied onto a substrate to form unevenness on the surface (the surface of a light diffusion film or the surface of a coating film). In this case, the unevenness on the surface exerts the light diffusion function or the matting function. When mixed in a light diffusible member such as a lighting cover and a light diffusion plate (a light diffusion layer), these resin particles are kneaded into a transparent base resin such as polycarbonate and polystyrene to give a mixture, and the mixture is subjected to extrusion molding, injection molding, or other techniques, thereby forming a molded article. The molded article exerts the light diffusion function due to the surface unevenness of the light diffusion member or to the difference in refractive index between the transparent base and the resin particles and serves as the light diffusion member.

The resin particles having excellent properties such as light diffusion properties and flatting properties are required to have a comparatively small particle diameter. However, the resin particles having a small particle diameter, which readily fly as dust and have poor flowability, are difficult to be handled. To address the problem, a plurality of resin particles are aggregated by, for example, spray drying to yield a resin particle aggregate, which is easily handled.

For example, Patent Literature 1 describes a particle aggregate including cross-linked polymer particles that are obtained by polymerizing a vinyl monomer mixture containing divinylbenzene or trimethylolpropane tri(meth)acrylate and a non-cross-linkable monomer.

Patent Literature 2 describes a powder composition that can be redispersed in water and is obtained by spray-drying a copolymer dispersion mixture including vinyl chloride, ethylene, and a copolymerizable functional monomer such as acrylamide in the presence of an anti-antagonist such as an inorganic extender pigment.

Patent Literature 3 describes a polymer particle aggregate obtained by spray-drying a slurry containing polymer particles that are obtained from a monomer mixture containing a monofunctional monomer and a polyfunctional monomer, a surfactant, an inorganic powder, and an aqueous medium.

CITATION LIST

Patent Literature

PTL 1: Japanese Unexamined Patent Application Publication No. 2000-53720.
PTL 2: Japanese Unexamined Patent Application Publication No. S58-74724.
PTL 3: Japanese Unexamined Patent Application Publication No. 2010-138365.

SUMMARY OF INVENTION

Technical Problem

However, Patent Literature 1 describes that the particle aggregate "is formed by connecting cross-linked polymer particles to each other" and "causes fusion between particles", for example. The description suggests that the particle aggregate has poor dispersibility into primary particles or a similar state and the cross-linked polymer particles are fused to each other. Patent Literature 1 describes that the invention has an object "to provide a particle aggregate having high strength". This suggests that the invention is Characterized by fusing the cross-linked polymer particles as a raw material so as not to readily disperse into primary particles, and the object differs from that of the present invention. On this account, if the particle aggregate described in Patent Literature 1 is subjected to, for example, pulverization in order to prepare primary particles, it is difficult to pulverize the particle aggregate into fine primary particles.

The powder composition described in Patent Literature 2 includes a polymer powder that has no cross-linked structure, and thus the polymer powder is supposed to readily cause fusion during spray drying. On this account, the powder composition described in Patent Literature 2 is also difficult to be dispersed into primary particles or a similar state when used as a compounding agent such as a light diffusing agent and a flatting agent for coating material, and thus the powder composition fails to achieve intended properties such as light diffusion properties and flatting properties.

The polymer particle aggregate described in Patent Literature 3 causes no fusion between the polymer particles but contains an inorganic powder in an amount of 1 part by mass or more relative to 100 parts by mass of the total amount of the monofunctional monomer and the polyfunctional monomer, and thus has poor optical transparency.

In view of the above problems, the present invention has an object to provide a resin particle aggregate that readily disperses into primary particles or a similar state and has good optical transparency.

Another object of the present invention is to provide a light diffusible resin composition and an optical film having good light diffusion properties and optical transparency, a composition for coating having good light diffusion properties and optical transparency or having good matting properties, and an external preparation having a good soft-focus effect (effect of obscuring wrinkles) and optical transparency or having good matting properties.

In an example of Patent Literature 3, a slurry having a comparatively low solid concentration of about 20% by mass is spray-dried to yield a polymer particle aggregate. During the spray drying, a large amount of water is evaporated over a long period of time, resulting in poor production efficiency. Furthermore, according to the production method in an example of Patent Literature 3, a slurry used for the spray drying has a low solid concentration, and thus a single droplet during the spray drying contains resin particles in a small ratio and contains water in a large ratio. During the spray drying, it is supposed that the droplet is dried to form a resin particle aggregate while maintaining the original size. On this account, by the production method in an example of Patent Literature 3, the obtained single resin particle aggregate contains the resin particles in a small amount and contains voids in a large ratio. As a result, the resin particle aggregate obtained by the production method in an example of Patent Literature 3 is readily deformed into other shapes except the spherical shape and thus is difficult to be handled.

In addition, Comparative Example 6 in Patent Literature 3 describes that aggregating was observed during polymerization without using inorganic particles and the polymer particle aggregate failed to be produced. In other words, the method for producing a polymer particle aggregate described in Patent Literature 3 requires inorganic particles and cannot produce a resin particle aggregate having good optical transparency.

Another object of the present invention is to provide a production method that can efficiently produce an easily-handled resin particle aggregate and can yield a resin particle aggregate without using an inorganic component in such an amount that the optical transparency is affected.

Solution to Problem

In order to solve the problems, the resin particle aggregate of the present invention is a resin particle aggregate formed by aggregating a plurality of resin particles including a polymer of a vinyl monomer. The resin particle aggregate includes 100 parts by mass of the resin particles and 1 to 5 parts by mass of a surfactant, the resin particles are cross-linked by a cross-linkable monomer in an amount of 9 to 50% by mass relative to the total mass of the resin particles, the resin particle aggregate contains an inorganic, component in an amount of 0.5% by mass or less, the resin particles have a volume average particle diameter D1, particles contained in a dispersion liquid of the resin particle aggregate in water have a volume average particle diameter D2, and the ratio of D2/D1 is 15 or less. The volume average particle diameter D2 is determined by mixing 0.50 g of the resin particle aggregate and 50 g of water, sonicating the mixture for 10 minutes with an ultrasonic disperser at an output power of 400 W and a frequency of 20 kHz to give a dispersion liquid, and then determining the volume average particle diameter of the particles contained in the dispersion liquid with a laser diffraction scattering particle size distribution analyzer by a method of calculating the volume average particle diameter of the particles with an optical model corresponding to a refractive index of the resin particles.

With the structure, the ratio of D2/D1 is 15 or less where the resin particles have a volume average particle diameter D1 and particles contained in a dispersion liquid of the resin particle aggregate in water have a volume average particle diameter D2, and thus the resin particle aggregate has readily dispersible properties into primary particle or a similar state when dispersed in water. This suggests that the resin particle aggregate readily disperses into primary particles or a similar state when mixed as a compounding agent such as a light diffusing agent and a flatting agent for coating material with other components. A conventional resin particle aggregate in which resin particles are fused to each other substantially maintains the original state even when dispersed in water, and thus the particles have a volume average particle diameter D2 of more than 15 (for example, about 28 to 32), which is substantially the same as the volume average particle diameter of the resin particle aggregate.

The resin particle aggregate with the structure contains a surfactant in an amount of 1 to 5 parts by mass relative to 100 parts by mass of the resin particles, and this can suppress the fusion between the resin particles. In addition, with the structure, the resin particles are cross-linked by a cross-linkable monomer in an amount of 9 to 50% by mass relative to the total mass of the resin particles and thus are hard. This prevents the resin particles from causing the fusion during the production of the resin particle aggregate.

The resin particle aggregate with the structure contains an inorganic component in an amount of 0.5% by mass or less and thus has good optical transparency.

On this account, the structure of the present invention can provide the resin particle aggregate that readily disperses into primary particles or a similar state and has good optical transparency.

In order to solve the problems, a method for producing a resin particle aggregate of the present invention includes a seed polymerization step by a seed polymerization method of allowing seed particles including a polymer of a first vinyl monomer to absorb a second vinyl monomer and polymerizing the second vinyl monomer to give resin particles, and a spray drying step of spray drying a slurry containing 100 parts by mass of the obtained resin particles, 1 to 5 parts by mass of a surfactant, and an aqueous medium with a spray dryer equipped with a slurry inlet and a powder outlet, the slurry being sprayed and introduced through the slurry inlet, the resin particle aggregate being discharged through the powder outlet, in a condition of a slurry inlet temperature ranging from 80° C. to 220° C. and a powder outlet temperature ranging from 40° C. to 100° C. In the method, no water-soluble polymer is used during the polymerization of the second vinyl monomer, the resin particles contain a cross-linkable monomer in an amount of 9 to 50% by mass relative to 100% by mass of the resin particles, and the slurry has a solid concentration ranging from 24 to 40% by mass.

In the method, the slurry used for spray drying has a high solid concentration, which reduces the amount of water evaporated by the spray drying. The method thus can shorten the time for the spray drying to improve the production efficiency.

In the method, the slurry used for spray drying has a high solid concentration, which increases the ratio of the resin particles and reduces the ratio of water in a single droplet (of the sprayed slurry) during the spray drying. During the spray drying, it is supposed that the droplet is dried (water and other components are removed) while maintaining the original size and forms a resin particle aggregate. On this account, the method increases the amount (filling ratio) of the resin particles contained in a single resin particle aggregate and reduces the ratio of voids in the resin particle aggregate. As a result, the obtained resin particle aggregate is unlikely to be deformed, has a spherical shape or substantially a spherical shape, and thus is easily handled.

In the method, the second vinyl monomer contains a cross-linkable monomer in an amount of 9 to 50% by mass relative to 100% by mass of the resin particles, and the slurry has a solid concentration ranging from 24 to 40% by mass. The method thus can prevent the resin particles from aggregating, which interferes with the production of the resin particles during the polymerization, without using inorganic particles in such an amount of more than 0.5 part by mass relative to 100 parts by mass of the resin particle aggregate that the optical transparency is affected, and thus the resin particle aggregate can be produced. The method can therefore produce a resin particle aggregate having good optical transparency.

From the above, the method of the invention can efficiently produce a easily-handled resin particle aggregate and can yield the resin particle aggregate without using an inorganic component in such an amount that the optical transparency is affected.

In the method, the resin particles contain a surfactant in an amount of 1 to 5 parts by mass relative to 100 parts by mass of the resin particles, and this can suppress the fusion between the resin particles during the spray drying. In the method, the resin particles are cross-linked by a cross-linkable monomer in an amount of 9 to 50% by mass relative to the total mass of the resin particles and thus are hard. This can suppress the fusion between the resin particles during the spray drying. In the method, no water-soluble polymer is used during the polymerization of the second vinyl monomer, and this can prevent a water-soluble polymer from connecting the resin particles to each other during the spray drying. In the method, the spray drying is performed in a condition of a slurry inlet temperature ranging from 80° C. to 220° C. and a powder outlet temperature ranging from 40° C. to 100° C., and this can suppress the fusion between the resin particles. The method of the invention can therefore yield a resin particle aggregate in which the fusion between the resin particles is suppressed.

The method employs the seed polymerization method and thus can readily yield the resin particle aggregate including resin particles having a uniform particle diameter.

In order to solve the problems, a light diffusible resin composition of the present invention is formed by mixing a transparent base resin and the resin particle aggregate of the present invention.

The light diffusible resin composition with the structure is formed by mixing the resin particle aggregate of the present invention, and thus the resin particle aggregate disperses into primary particles or a similar state in the composition. This can improve the light diffusion properties and can suppress the reduction in optical transparency.

In order to solve the problems, a composition for coating of the present invention is formed by compounding the resin particle aggregate of the present invention.

The composition for coating with the structure is formed by mixing the resin particle aggregate of the present invention, and thus the resin particle aggregate disperses into primary particles or a similar state in the composition. On this account, a composition for a transparent coating has good light diffusion properties and optical transparency, and a composition for an opaque coating, such as a coating material has good matting properties.

In order to solve the problems, an optical film of the present invention is obtained by coating a substrate film with the composition for coating. This can achieve an optical film having good light diffusion properties and optical transparency.

In order to solve the problems, an external preparation of the present invention is formed by compounding the resin particle aggregate of the present invention.

The external preparation with the structure includes the resin particle aggregate of the present invention, and thus the resin particle aggregate disperses into primary particles or a similar state in the preparation. On this account, a transparent external preparation has a good soft-focus effect and optical transparency, and an opaque external preparation has good matting properties.

Advantageous Effects of Invention

As described above, the present invention enables the efficient production of an easy-handled resin particle aggregate and can provide a method for producing a resin particle aggregate suited for producing a resin particle aggregate containing an inorganic component in a low amount, a light diffusible resin composition having good light diffusion properties and optical transparency, an optical film having good light diffusion properties and optical transparency, a composition for coating having good light diffusion properties and optical transparency or having good matting properties, and an external preparation having a good soft-focus effect (effect of obscuring wrinkles) and optical transparency or having good matting properties.

DESCRIPTION OF EMBODIMENTS

Resin Particle Aggregate

Figure 1:
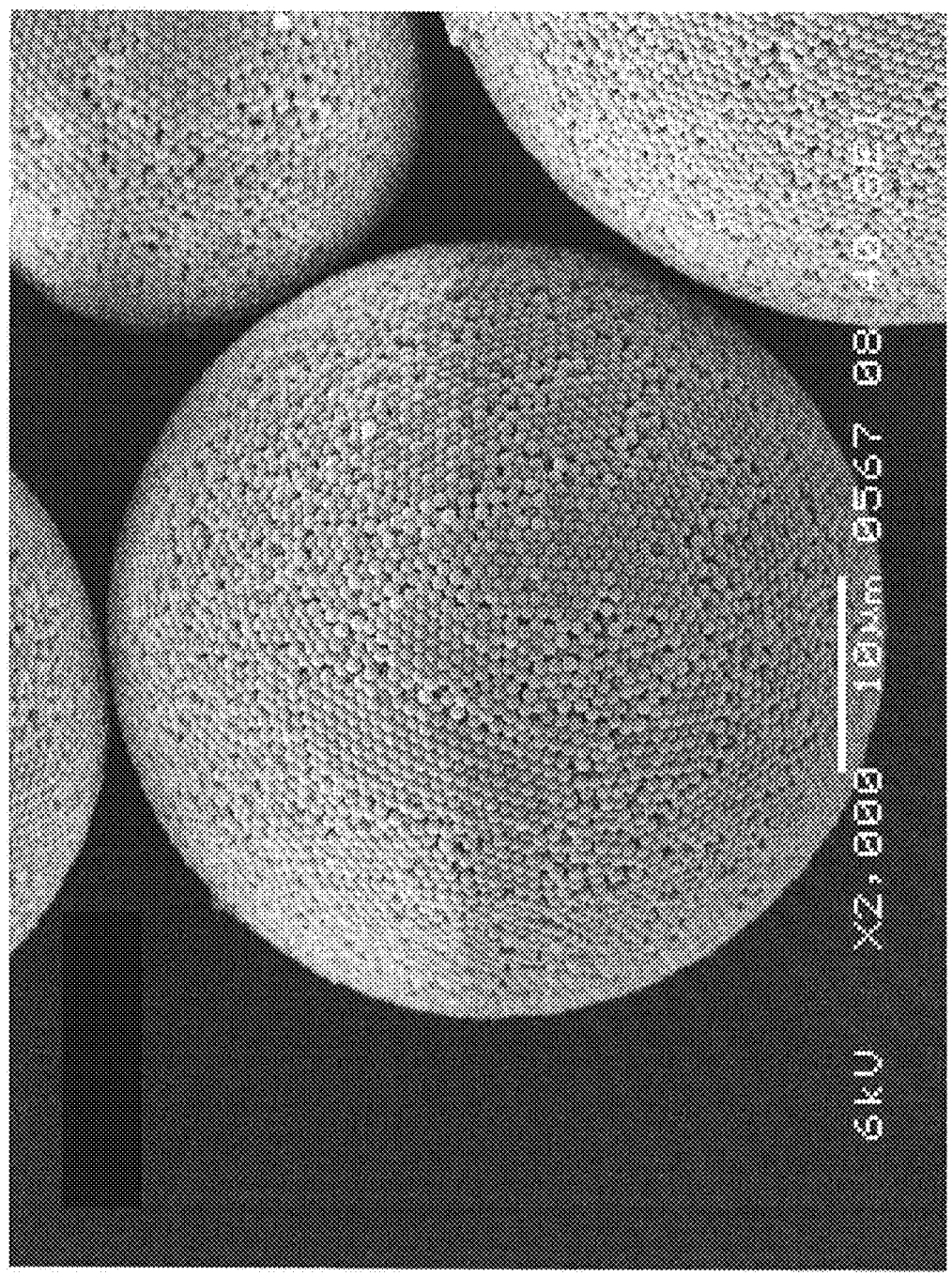
FIG. 1 is a scanning electron microscope (SEM) image of a resin particle aggregate pertaining to an example of the present invention.

The resin particle aggregate of the present invention is a resin particle aggregate formed by aggregating a plurality of resin particles (primary particles) including a polymer of a vinyl monomer. The resin particle aggregate includes 100 parts by mass of the resin particles and 1 to 5 parts by mass of a surfactant, the resin particles are cross-linked by a cross-linkable monomer in an amount of 9 to 50% by mass relative to the total mass of the resin particles, the resin particle aggregate contains an inorganic component in an amount of 0.5% by mass or less, the resin particles have a volume average particle diameter D1, particles contained in a dispersion liquid of the resin particle aggregate in water have a volume average particle diameter D2, and the ratio of D2/D1 is 15 or less. Here, the volume average particle diameter D2 is determined by mixing 0.50 g of the resin particle aggregate and 50 g of water, sonicating the mixture for 10 minutes with an ultrasonic disperser at an output power of 400 W and a frequency of 20 kHz to give a dispersion liquid, and then determining the volume average particle diameter of the particles contained in the dispersion liquid with a laser diffraction scattering particle size distribution analyzer by a method of calculating the volume average particle diameter of the particles with an optical model corresponding to a refractive index of the resin particles.

The ratio of D2/D1 is more preferably 11 or less. This can achieve a resin particle aggregate capable of readily dispersing into primary particles or an extremely similar state.

In the resin particle aggregate of the present invention, it is preferable that the ratio of particles having a particle diameter larger than a volume average particle diameter D3 of the resin particle aggregate with respect to the particles contained in the dispersion liquid of the resin particle aggregate in water be 1% by volume or less. In this case, 99% by volume or more of the resin particle aggregate has properties of dispersing into particles having a smaller particle diameter when the resin particle aggregate is dispersed in water. This suggests that the resin particle aggregate readily disperses into primary particles or a similar state when the resin particle aggregate is mixed as a compounding agent such as a light diffusing agent and a flatting agent for coating material with other components. This case can thus achieve the resin particle aggregate that readily disperses into primary particles or a similar state.

Here, the ratio of particles having a particle diameter larger than the volume average particle diameter D3 of the resin particle aggregate with respect to the particles contained in the dispersion liquid of the resin particle aggregate in water is determined by mixing 0.50 g of the resin particle aggregate and 50 g of water, sonicating the mixture for 10 minutes with an ultrasonic disperser at an output power of 400 W and a frequency of 20 kHz to give a dispersion liquid, then determining a volumetric particle size distribution of the particles contained in the dispersion liquid with a laser diffraction scattering particle size distribution analyzer by a method of calculating the volume average particle diameter of particles with an optical model corresponding to a refractive index of the resin particles, and calculating the ratio from the determined volumetric particle size distribution and the volume average particle diameter D3 of the resin particle aggregate. The volume average particle diameter D3 of the resin particle aggregate is an arithmetic mean of volume average particle diameter determined by a laser diffraction scattering method and is specifically a value determined by the measurement method described in [Examples].

The vinyl monomer consists a monofunctional vinyl monomer and the cross-linkable monomer.

The monofunctional vinyl monomer used in the present invention is a compound having a polymerizable alkenyl group (vinyl group in a broad sense) per molecule. Usable examples of the monofunctional vinyl monomer include an aromatic vinyl monomer, a (meth)acrylic ester monomer, a vinyl halide monomer, and a vinyl cyanide monomer. Usable examples of the aromatic vinyl monomer include styrenes (styrenic monomers) such as styrene and α-methylstyrene. Usable examples of the (meth)acrylic ester monomer include alkyl(meth)acrylates such as methyl(meth)acrylate, ethyl(meth)acrylate, n-propyl(meth)acrylate, n-butyl(meth)acrylate, isobutyl(meth)acrylate, tert-butyl(meth)acrylate, n-pentyl(meth)acrylate, and n-hexyl(meth)acrylate. These monofunctional vinyl monomers may be used singly or in combination of two or more of them. Among these monofunctional vinyl monomers, at least one monomer selected from the styrenes and the alkyl(meth)acrylates (alkyl(meth)acrylate monomers) preferred, and at least one monomer selected from styrene and the alkyl(meth)acrylates having an alkyl group with a carbon number of 1 to 4 is more preferred. This can achieve a resin particle aggregate having good total light transmittance. When the monofunctional vinyl monomer is an alkyl(meth)acrylate having an alkyl group with a carbon number of 5 or more, the resin particles are likely to be fused, and the resin particle aggregate is unlikely to disperse into primary particles. Thus, the alkyl(meth)acrylate having alkyl group with a carbon number of 5 or more is not preferred.

In the present specification, "(meth)acrylic" means acrylic or methacrylic, and "(meth)acrylate" means acrylate or methacrylate.

The cross-linkable monomer cross-linking the resin particles is a compound having a plurality of polymerizable alkenyl groups (vinyl groups in a broad sense) per molecule. Examples of the cross-linkable monomer include styrenic cross-linkable monomers such as divinylbenzene; and (meth)acrylic ester cross-linkable monomers such as ethylene glycol di(meth)acrylate and trimethylolpropane tri(meth)acrylate. The cross-linkable monomer is preferably at least one monomer of divinylbenzene, ethylene glycol di(meth)acrylate, and trimethylolpropane tri(meth)acrylate. This makes the resin particles included in the resin particle aggregate hard and thus can further suppress the fusion between the resin particles. This can also improve the strength, heat resistance, and solvent resistance of the resin particles.

The amount of the cross-linkable monomer cross-linking the resin particles is in a range from 9 to 50% by mass relative to total mass of the resin particles (equal to the sum of the mass of the monofunctional vinyl monomer, the mass of the cross-linkable monomer, the mass of a polymerization initiator, the mass of optionally used additives (for example, a chain transfer agent) taking part in the polymerization reaction, and the mass of optionally used seed particles). If the amount of the cross-linkable monomer is less than 9% by mass relative to the total mass of the resin particles, the resin particles soften during heating, and thus the resin particles are fused to each other during drying of the resin particles for the production of the resin particles. If the amount of the cross-linkable monomer is more than 50% by mass relative to the total mass of the resin particles, the resin particles are aggregated during the polymerization for the production of the resin particles, and thus the intended resin particle aggregate cannot be obtained. The amount of the cross-linkable monomer is more preferably 20 to 50% by mass relative to the total mass of the resin particles. This can further suppress the fusion between the resin particles during drying and the aggregating of the resin particles during polymerization.

The surfactant included in the resin particle aggregate of the present invention is not particularly limited and may be any of anionic surfactants, nonionic surfactants, cationic surfactants, and amphoteric surfactants.

Examples of the anionic surfactant include dialkyl sulfosuccinate salts such as dioctyl sodium sulfosuccinate; phosphate ester salts such as sodium polyoxyethylene alkylphenyl ether phosphate and sodium polyoxyalkylene aryl ether phosphate; fatty acid oils such as sodium oleate and castor oil potassium; alkyl sulfate salts such as sodium lauryl sulfate and ammonium lauryl sulfate; alkylbenzene sulfonate salts such as sodium dodecylbenzenesulfonate; alkylnaphthalenesulfonate salts; alkane sulfonate salts; alkyl phosphate ester salts; naphthalenesulfonate formalin condensates; polyoxyethylene alkylphenyl ether sulfate ester salts; polyoxyethylene alkylsulfate ester salts.

Examples of the nonionic surfactant include polyoxyethylene alkyl ethers such as polyoxyethylene tridecyl ether; polyoxyethylene alkylphenyl ether; polyoxyethylene styrenated phenyl ether; polyoxyalkylene alkyl ethers such as a polyoxyalkylene tridecyl ether having an alkylene group with a carbon number of 3 or more; polyoxyethylene fatty acid ester; sorbitan fatty acid ester; polyoxyethylene sorbitan fatty acid esters such as polyoxyethylene sorbitan monolaurate; polyoxyethylene alkylamine; glycerol fatty acid ester; and oxyethylene-oxypropylene block copolymers.

Examples of the cationic surfactant include alkylamine salts such as laurylamine acetate and stearylamine acetate; and quaternary ammonium salts such as lauryltrimethylammonium chloride.

Examples of the amphoteric surfactant include lauryldimethylamine oxide, phosphate ester surfactants, and phosphite ester surfactants.

Among these surfactants, the surfactant included in the resin particle aggregate of the present invention is preferably at least either of the anionic surfactant and the nonionic surfactant. The anionic surfactant is preferably the phosphate ester salt or the sulfosuccinate salt, and the nonionic surfactant is preferably polyoxyethylene alkylphenyl ether or polyoxyethylene styrenated phenyl ether. The surfactants may be used singly or in combination of two or more of them.

The surfactant is contained in an amount ranging from 1 to 5 parts by mass relative to 100 parts by mass of the resin particles. A resin particle aggregate containing the surfactant in an amount of less than 1 part by mass relative to 100 parts by mass of the resin particles has an insufficient suppressive effect on the fusion between resin particles, and thus such an amount is not preferred. A resin particle aggregate containing the surfactant in an amount of more than 5 parts by mass relative to 100 parts by mass of the resin particles fails to have an effect corresponding to the amount of the surfactant, and thus such an amount is not preferred.

The amount of an inorganic component contained in the resin particle aggregate of the present invention is preferably, substantially 0 (less than the detection limit) and may be 0.5% by mass or less. Examples of the inorganic component include powders of inorganic materials such as barium sulfate, titanium oxide, calcium carbonate, and colloidal silica; and poorly-water-soluble inorganic salts such as tribasic calcium phosphate, magnesium hydroxide, magnesium pyrophosphate, barium sulfate, calcium carbonate, and silica.

The polymerization method for producing the resin particles included in the resin particle aggregate of the present invention is not particularly limited, and an emulsion polymerization method, a suspension polymerization method, a dispersion polymerization method, and a seed polymerization method may be employed, for example. Among these polymerization methods, preferred are methods except the suspension polymerization method that typically produces particles having a wide particle size distribution, and the seed polymerization method is most preferred because the method can easily produce resin particles that have a preferred volume average particle diameter (0.1 to 2.0 µm) and a preferred particle size distribution (a variation coefficient of 20% or less) and are cross-linked by a cross-linkable monomer in an amount of 9 to 50% by mass relative to the total mass of the resin particles. In the seed polymerization method, seed particles including a polymer of a first vinyl monomer are allowed to absorb a second vinyl monomer, and the second vinyl monomer is polymerized. The seed particles are not particularly limited and are preferably (meth)acrylic resin particles. The seed particles are more preferably non-cross-linked.

A typical method for producing resin particles may employ a water-soluble polymer such as polyvinyl alcohol and polyvinylpyrrolidone as a dispersion stabilizer for polymerization in order to improve polymerization stability. However, when the water-soluble polymer is used during the polymerization for producing resin particles, the water-soluble polymer works as a binder, and the water-soluble polymer is fused to the resin particles to connect the resin particles to each other during spray drying of the resin particles. This may interfere with the production of the intended resin particle aggregate that readily disperses into primary particles or a similar state. To address this, the resin particles included in the resin particle aggregate of the present invention is preferably produced by polymerization without using the water-soluble polymer. Polymerization methods employing an inorganic dispersion stabilizer, such as a suspension polymerization method, are not preferred because the inorganic dispersion stabilizer may remain in the resin particle aggregate to lower the optical transparency of the resin particles.

The seed particles preferably have a mass average molecular weight (Mw) of 50,000 or less. Seed particles having a mass average molecular weight of more than 50,000 is unlikely to be allowed to absorb the second vinyl monomer, thus widening the particle size distribution of the obtained resin particles. The resin particles having a wider particle size distribution increase the number of points on the resin particles to be in contact with each other. This readily causes the fusion between the resin particles, and thus the obtained resin particle aggregate is difficult to disperse into primary particles or a similar state. When the resin particle aggregate of the present invention including resin particles having a wider particle size distribution is mixed with other components, the resin particles are likely to provide uneven effects such as a light diffusion effect and a flatting effect.

The seed particles are preferably non-cross-linked particles or slightly-cross-linked particles (particles cross-linked to such a degree that the particles are soluble in a solvent). Seed particles cross-linked to such a degree that the particles are insoluble in a solvent are not preferred in order to yield spherical particles including uniform contents because such seed particles are allowed to absorb a vinyl monomer in a smaller amount and yield resin particles that have a core-shell shape (the seed particles maintain a spherical shape) or are deformed, for example.

The ratio of the seed particles relative to the total mass of the vinyl monomer making up the resin particles, that is, the ratio of the seed particles relative to the total mass of the resin particles is preferably 10% by mass or less. When non-cross-linked or slightly cross-linked seed particles are contained in a ratio of more than 10% by mass relative to the total mass of the resin particles, seed particles having a low glass transition temperature are fused during drying of the resin particles to cause the fusion between the resin particles, and thus such a ratio is not preferred. The ratio of seed particles relative to the total mass of the resin particles can be analyzed by dissolving the seed particles contained in the resin particles in a solvent.

The resin particles included in the resin particle aggregate of the present invention preferably have a volume average particle diameter D1 ranging from 0.1 to 2.0 µm, more preferably ranging from 0.3 to 1.5 µm, and even more preferably ranging from 0.5 to 1.0 µm. Resin particles having a volume average particle diameter D1 of less than 0.1 µm would reduce properties such as optical transparency. Resin particles having a volume average particle diameter D1 of more than 2.0 µm would reduce properties such as light diffusion properties and flatting properties or would necessitate the use of the resin particle aggregate in a large amount in order to achieve an intended effect such as a light diffusion effect and a flatting effect.

The resin particles included in the resin particle aggregate of the present invention preferably have a variation coefficient of particle diameter of 20% or less. The resin particles more preferably have a volume average particle diameter D1 ranging from 0.1 to 2.0 µm and a variation coefficient of particle diameter of 20% or less. This makes the resin particles have uniform properties such as light diffusion properties and flatting properties when the resin particle aggregate of the present invention is mixed with other components. This enlarges the void among particles that are in contact with each other, and thus the resin particles are unlikely to be fused. On this account, the resin particle aggregate readily disperses into primary particles or a similar state. The variation coefficient is the variation coefficient of volumetric particle size distribution and specifically a value determined by the measurement method to be described in [Examples].

[Method for Producing Resin Particle Aggregate]

A production method of the present invention suited for the production of the resin particle aggregate of the present invention will next be described. The production method of the present invention includes a seed polymerization step by a seed polymerization method of infiltrating seed particles including a polymer of a first vinyl monomer with a second vinyl monomer and polymerizing the second vinyl monomer to give resin particles and a spray drying step of spray drying a slurry containing 100 parts by mass of the obtained resin particles, 1 to 5 parts by mass of a surfactant, and an aqueous medium with a spray dryer equipped with a slurry inlet and a powder outlet, the slurry being sprayed and introduced through the slurry inlet, the resin particle aggregate being discharged through the powder outlet, in a condition of a slurry inlet temperature ranging from 80° C. to 220° C. and a powder outlet temperature ranging from 40° C. to 100° C. In the method, no water-soluble polymer is used during the polymerization of the second vinyl monomer, the resin particles contain a cross-linkable monomer in an amount of 9 to 50% by mass relative to 100% by mass of the resin particles, and the slurry has a solid concentration ranging from 24 to 40% by mass.

The first vinyl monomer and the second vinyl monomer may be the vinyl monomers described above. The first vinyl monomer preferably does not include the cross-linkable monomer but includes the monofunctional vinyl monomer alone, and the second vinyl monomer preferably includes the monofunctional vinyl monomer and the cross-linkable monomer. The first vinyl monomer is preferably the (meth) acrylic ester monomer or the aromatic vinyl monomer, more preferably the alkyl(meth)acrylate or styrene, and even more preferably the alkyl(meth)acrylate having an alkyl group with a carbon number of 1 to 4.

Each of the surfactant and the aqueous medium may be added after the polymerization of the second vinyl monomer or may be added before the polymerization of the second vinyl monomer. The surfactant and the aqueous medium are preferably added before the polymerization of the second vinyl monomer. Accordingly; the second vinyl monomer is preferably dispersed in the aqueous medium containing the surfactant and polymerized, and the reaction solution after the polymerization is preferably subjected to the spray drying step without the removal of water. This enables efficient production of the resin particle aggregate.

Examples of the aqueous medium include, but are not necessarily limited to, water and a mixed medium of water and a water-soluble organic medium (lower alcohols (alcohols with a carbon number of 5 or less) such as methanol and ethanol). The aqueous medium is typically used in an amount ranging from 100 to 1,000 parts by mass relative to 100 parts by mass of the second vinyl monomer in order to stabilize the resin particles.

The second vinyl monomer in the aqueous medium is preferably polymerized by stirring an aqueous suspension in which the second vinyl monomer is dispersed as spherical droplets. The stirring is mildly performed to such a degree that the spherical droplets are prevented from floating or the polymerized particles are prevented from settling, for example.

The polymerization temperature for the second vinyl monomer is preferably in a range from 30 to 100° C. and more preferably in a range from 40 to 80° C. The polymerization temperature is preferably maintained for a period of time ranging from 0.1 to 20 hours.

The polymerization of the second vinyl monomer typically employs a polymerization initiator. Examples of the polymerization initiator include peroxides such as benzoyl peroxide, lauroyl peroxide, and tert-butyl peroxyisobutyrate; azo compounds such as 2,2'-azobisisobutyronitrile, 2,2'-azobis(2,4-dimethylvaleronitrile), and 2,2'-azobis(2-methylpropionate); and peroxide salts such as potassium persulfate and ammonium persulfate.

The polymerization initiator used for the polymerization of the second vinyl monomer is preferably an oil-soluble polymerization initiator such as benzoyl peroxide and 2,2'-azobisisobutyronitrile when the surfactant concentration is equal to or higher than a critical micelle concentration. The polymerization of the second vinyl monomer with the oil-soluble polymerization initiator can suppress the generation of new particles except the intended resin particles in comparison with the ease with a water-soluble polymerization initiator such as potassium persulfate.

The polymerization initiator is preferably used in an amount ranging from 0.01 to 10 parts by mass and more preferably in an amount ranging from 0.01 to 5 parts by mass relative to 100 parts by mass of the second vinyl monomer. A polymerization initiator used in an amount of less than 0.01 part by mass relative to 100 parts by mass of the second vinyl monomer would not achieve the polymerization initiation function. A polymerization initiator used in an amount of more than 10 parts by mass relative to 100 parts by mass of the second vinyl monomer is economically disadvantageous and thus is not preferred.

The polymerization of the second vinyl monomer employs the surfactant in an amount ranging from 1 to 5% by mass relative to the total amount of the first vinyl monomer and the second vinyl monomer. A surfactant used in an amount of less than 1% by mass relative to the total amount of the first vinyl monomer and the second vinyl monomer is not preferred because the polymerization stability is difficult to be maintained. A surfactant used in an amount of more than 5% by mass relative to the total amount of the first vinyl monomer and the second vinyl monomer is not preferred because new particles except the intended resin particles are generated to reduce the function as the light diffusing agent and the like.

The second vinyl monomer may be polymerized together with a chain transfer agent in order to improve heat resistance of the resin particles. Examples of the chain transfer agent include mercaptans such as n-octyl mercaptan, n-dodecyl mercaptan, and tert-dodecyl mercaptan; terpenes such as γ-terpinen and dipentene; halogenated hydrocarbons such as chloroform and carbon tetrachloride; and α-methylstyrene dimer. In order to improve the heat resistance of the resin particles, additives such as an antioxidant may be added.

The seed particles can be obtained by polymerizing the first vinyl monomer. Examples of the method for polymerizing the first vinyl monomer include, but are not necessarily limited to, a soap-free polymerization method (emulsion polymerization method without using a surfactant), an emulsion polymerization method, a suspension polymerization method, a dispersion polymerization method, and a seed polymerization method. Among these polymerization methods, the soap-free polymerization method is most preferred.

The polymerization temperature for the first vinyl monomer is preferably in a range from 30 to 100° C. and more preferably in a range from 40 to 80° C. The temperature is preferably maintained for a period of time ranging from 1 to 30 hours.

The polymerization of the first vinyl monomer typically employs a polymerization initiator. The polymerization initiator used for the polymerization of the first vinyl monomer may be the same polymerization initiator as used for the second vinyl monomer, and a water-soluble polymerization initiator such as potassium persulfate and ammonium persulfate is preferably used.

The polymerization initiator is preferably used in an amount ranging from 0.01 to 10 parts by mass and more preferably in an amount ranging from 0.01 to 5 parts by mass relative to 100 parts by mass of the first vinyl monomer. A polymerization initiator used in an amount of less than 0.01 part by mass relative to 100 parts by mass of the first vinyl monomer would not achieve the polymerization initiation function. A polymerization initiator used in an amount of more than 10 parts by mass relative to 100 parts by mass of the first vinyl monomer is economically disadvantageous and thus is not preferred.

The first vinyl monomer is preferably polymerized without using a surfactant. The first vinyl monomer may be polymerized together with a chain transfer agent in order to control the molecular weight. The chain transfer agent may be those used for the polymerization of the second vinyl monomer.

Next, in the spray drying step, spray drying is performed in order to yield a resin particle aggregate from the resin particles. The spray drying of a slurry containing the resin particles enables the formation of a resin particle aggregate from the resin particles and also enables the control of the particle diameter and shape of the resin particle aggregate. The spray drying method typically employs a spray drying apparatus such as a spray dryer and a flash dryer and sprays an aqueous dispersion (slurry containing resin particles) together with a gas stream to dry the particles. Appropriately adjusting the supply speed of the aqueous dispersion, the drying temperature, the atomizer rotation speed of a spray dryer, and other conditions during the spray drying enables the control of the particle diameter, particle shape, and the like of the resin particle aggregate.

As for the drying temperature, the temperature at a slurry inlet through which a slurry is sprayed to be introduced is in a range from 80° C. to 220° C., and the temperature at a powder outlet through which a resin particle aggregate is discharged is in a range from 40° C. to 100° C. The spray drying with a slurry inlet temperature of 220° C. or higher is not preferred because the resin particles are likely to be fused to each other to yield a resin particle aggregate in which the resin particles are connected to each other. The spray drying with a slurry inlet temperature of less than 80° C. causes problems such as insufficient drying and excessively low drying efficiency.

The spray drying with a powder outlet temperature of less than 40° C. would lead to insufficient drying. The spray drying with a powder outlet temperature of higher than 100° C. readily causes the fusion between the resin particles.

The solid concentration in the slurry used for the spray drying, that is, the concentration of the resin particles in the slurry (resin particle dispersion) used for the spray drying is preferably 24% by mass or more and 40% by mass or less. A slurry having a solid concentration of less than 24% by mass contains a large amount of an aqueous medium, and thus the resin particle aggregate is readily deformed during drying. A slurry having a solid concentration of less than 24% by mass increases the ratio of voids in the resin particle aggregate, thus the resin particle aggregate is readily deformed to have a shape except the spherical shape, and such a resin particle aggregate is difficult to be handled. A slurry having a solid concentration of more than 40% by mass makes the production difficult.

The resin particles may be classified after the seed polymerization step, and the classified resin particles may be subjected to the spray drying step. This can reduce the amount of coarse particles contained in the slurry and accordingly can reduce the coarse particles contained in the resin particle aggregate. As a result, when a substrate is coated with a composition for coating formed by compounding the resin particle aggregate, the (cured) composition for coating can be prevented from having streaks, and when a substrate film is coated with a composition for coating formed by compounding with the resin particle aggregate, the optical film obtained after the coating can be prevented from having bright points.

The slurry used in the spray drying step preferably contains an inorganic component in an amount of 0.5% by mass or less relative to the total mass of the resin particles. This enables the production of the resin particle aggregate containing an inorganic component in a small amount and having good optical transparency.

The resin particle aggregate of the present invention preferably has a volume average particle diameter ranging from 2 to 250 μm and more preferably ranging from 5 to 100 μm. It is typically difficult to perform spray drying so as to yield the resin particle aggregate having a volume average particle diameter of less than 2 μm, and thus it is difficult to produce the resin particle aggregate having a volume average particle diameter of less than 2 μm. A resin particle aggregate having a volume average particle diameter of more than 250 μm is dried at a lower drying efficiency, and this lowers the production efficiency.

[Light Diffusible Resin Composition]

A light diffusible resin composition of the present invention is formed by mixing a transparent base resin and the resin particle aggregate of the present invention as a light diffusing agent.

The transparent base resin included in the light diffusible resin composition of the present invention is typically a thermoplastic resin having high transparency. Examples of the transparent base resin include thermoplastic resins such as (meth)acrylic resins (poly(meth)acrylic esters) such as polymethyl methacrylate, an alkyl(meth)acrylate-styrene copolymer, polycarbonate, polyester, polyethylene, polypropylene, and polystyrene. Among these thermoplastic resins, a (meth)acrylic resin, an alkyl(meth)acrylate-styrene copolymer, polycarbonate, polyester, and polystyrene are preferred when excellent transparency is required. These thermoplastic resins may be used singly or in combination of two or more of them.

The amount of the resin particle aggregate added to the transparent base resin is preferably in a ratio ranging from 0.01 to 100 parts by mass relative to 100 parts by mass of the transparent base resin. This can improve light diffusion properties and optical transparency. When added in a ratio of less than 0.01 parts by mass, the resin particle aggregate would be difficult to impart the light diffusion properties. When added in a ratio of more than 100 parts by mass, the resin particle aggregate imparts the light diffusion properties but would lower the optical transparency. The amount of the resin particle aggregate is more preferably in a ratio ranging from 0.1 to 10 parts by mass relative to 100 parts by mass of the transparent base resin.

The light diffusible resin composition may be produced by any method and can be produced, for example, by mixing the resin particle aggregate of the present invention and a transparent base resin by a mixing method such as a mechanical pulverizing and mixing method. The mechanical pulverizing and mixing method may employ, for example, a Henschel Mixer, a V-type mixer, a Turbula mixer, a Hybridizer, and a Rocking Mixer for the mixing and stirring.

The light diffusible resin composition can be molded to yield a molded article (light diffusion member) made of the light diffusible resin composition. For example, the resin particle aggregate and a transparent base resin is mixed with a mixer; the mixture is kneaded with a melt-kneader such as an extruder to yield pellets of the light diffusible resin composition; and then the pellets are extrusion-molded or melted and then injection-molded, thereby yielding a molded article having any shape and made of the light diffusible resin composition.

The molded article including the light diffusible resin composition can be used, for example, as lighting covers such as a lighting cover for a light emitting diode (LED) lighting device and a lighting cover for a fluorescent lighting device; and light diffusion plates such as a light diffusion plate for a liquid crystal display. The liquid crystal display employing the light diffusion plate may have any structure that includes the light diffusion plate. For example, the liquid crystal display includes at least a liquid crystal display panel having a display surface and a back surface, a light guide plate disposed facing the back surface of the panel, and a light source emitting light to the side face of the light guide plate. In the liquid crystal display, the light guide plate has one face facing the liquid crystal display panel, a light diffusion plate is disposed on the one face of the light guide plate, and a reflection sheet is disposed on the other face of the light guide plate. The arrangement of the light source is typically referred to as an edge light-type backlight system. Another arrangement of the light source in the liquid crystal display is, in addition to the edge light-type backlight system, a direct-type backlight system. Specifically, this system includes at least a light source at the back side of a liquid crystal display panel and a light diffusion plate between the liquid crystal display panel and the light source.

[Composition for Coating]

The resin particle aggregate of the present invention can be contained in a composition for coating, for example, as a flatting agent for coating material, a light diffusing agent for a light diffusion film, and particles for an antiglare film. The composition for coating of the present invention is formed by compounding the resin particle aggregate of the present invention and other components.

The composition for coating may contain a binder resin, as necessary. The binder resin may be a resin soluble in an organic solvent or water, or an emulsion-type aqueous resin dispersible in water. Examples of such a binder resin include an acrylic resin, an alkyd resin, a polyester resin, a polyurethane resin, a chlorinated polyolefin resin, and an amorphous polyolefin resin. These binder resins can be appropriately selected depending on the adhesion to a substrate to be coated and an environmental condition for use, for example. The amounts of the binder resin and the resin particle aggregate vary depending on an application, the thickness of a coating film to be formed, the average particle diameter of resin particles, and a coating method.

The composition for coating contains a solvent, as necessary. The solvent contained in the composition for coating is not particularly limited and is preferably a solvent that can dissolve or disperse the binder resin. Examples of the solvent used in an oil coating material or the like as the composition for coating include hydrocarbon solvents such as toluene and xylene; ketone solvents such as methyl ethyl ketone and methyl isobutyl ketone; ester solvents such as ethyl acetate and n-butyl acetate; and ether solvents such as dioxane, ethylene glycol diethyl ether, and ethylene glycol mono-n-butyl ether. Examples of the solvent used in a water coating material or the like as the composition for coating include aqueous solvents (aqueous mediums) such as water and alcohols. These solvents may be used singly or as a mixture of two or more of them. The composition for coating contains a solvent typically in an amount ranging from 20 to 60% by mass relative to the total amount of the composition for coating.

The composition for coating may contain known additives such as a coating surface adjuster, a fluidity adjuster, an ultraviolet absorber, a light stabilizer, a curing catalyst, an extender pigment, a color pigment, a metal pigment, a mica powder pigment, a dye, and an organic solvent, as necessary.

The method for forming a coating film employing the composition for coating is not particularly limited and may be any known method. Examples of the method for forming a coating film employing the composition for coating include spray coating, roll coating, gravure coating, comma coating, and brush coating.

The composition for coating may be diluted with a diluent in order to control the viscosity, as necessary. Examples of the diluent include hydrocarbon solvents such as toluene and xylene; ketone solvents such as methyl ethyl ketone and methyl isobutyl ketone; ester solvents such as ethyl acetate and butyl acetate; ether solvents such as dioxane and ethylene glycol diethyl ether; water; and alcohol solvents. These diluents may be used singly or as a mixture of two or more of them.

[Optical Film]

An optical film of the present invention is obtained by coating a substrate film with the composition for coating of the present invention. The optical film of the present invention can be used as an antiglare film, a light diffusion film, and other films.

The substrate film may be made of any material that is transparent, and examples of the material include polyester resins such as polyethylene terephthalate, triacetyl cellulose resins, polystyrene resins, polycarbonate resins, and cycloolefin resins. Among them, polyethylene terephthalate is particularly preferred from the viewpoint of surface smoothness and mechanical strength.

The substrate film preferably has a thickness ranging from 5 to 300 μm. A substrate film having a thickness of less than 5 μm is difficult to be handled, for example, during coating, printing, and secondary processing, and this would reduce the workability. A substrate film having a thickness of more than 300 μm would reduce the visible light transmittance of the substrate film itself.

The optical film of the present invention can be obtained by forming a layer of the composition for coating of the present invention on at least one side a substrate film by a means such as application. Examples of the application method include roll coating and spray coating.

[External Preparation]

The resin particle aggregate of the present invention can also be used as the material for an external preparation. The external preparation of the present invention is formed by compounding the resin particle aggregate of the present invention with other components. The amount of the resin particle aggregate contained in the external preparation can be appropriately adjusted depending on a type of the external preparation and is preferably in a range of 1 to 80% by mass and more preferably in a range of 5 to 70% by mass. The resin particle aggregate added in an amount of less than 1% by mass relative to the total amount of the external preparation would not achieve an obvious effect. The resin particle aggregate added in an amount of more than 80% by mass would not achieve a marked effect corresponding to the increase in amount and thus is not preferred from the viewpoint of production cost.

Examples of the external preparation include cosmetics and external medicines.

Examples of the cosmetic include liquid cosmetics such as a pre-shave lotion, a body lotion, a skin lotion, a cosmetic cream, a milky lotion, a body shampoo, and an antiperspirant; washing cosmetics such as a soap and a scrub cleanser; skin packs; shaving creams; face powders; makeup foundations; lip sticks; lip balms; cheek color; eye makeup cosmetics; nail polish cosmetics; hair washing cosmetics; hair coloring preparations; hair dressing; fragrance; toothpaste; bath preparations; sunscreen preparations; suntan preparations; and body cosmetics such as a body powder and a baby powder.

The external medicine may be any external medicine that is applied to skin and is exemplified by a pharmaceutical cream, an ointment, a pharmaceutical milky lotion, and a pharmaceutical lotion.

Such an external preparation can contain a commonly used main agent or additive depending on the purpose as long as the effect of the invention is not impaired. Examples of the main agent and the additive include water, lower alcohols (alcohols with a carbon number of 5 or less), oils and fats and waxes, hydrocarbons, higher fatty acids (fatty acids with a carbon number of 12 or more), higher alcohols (alcohols with a carbon number of 6 or more), sterols, fatty acid esters (for example, cetyl 2-ethylhexanoate), metallic soaps, moisturizers, surfactants (for example, sorbitan sesquioleate), polymer compounds, clay minerals (components having several functions, such as an extender pigment and an adsorbent; for example, talc and mica), color materials (for example, titanium oxide, red iron oxide, yellow iron oxide, and black iron oxide), perfumes, antiseptics, antioxidants, ultraviolet absorbers, other resin particles such as silicone particles and polystyrene particles, and special additives.

EXAMPLES

The present invention will next be described with reference to examples and comparative examples, but the present invention is not intended to be limited to them.

[Measurement Method of Mass Average Molecular Weight of Seed Particles]

The mass average molecular weight of seed particles was determined by gel permeation chromatography (GPC). The determined mass average molecular weight was polystyrene (PS)-equivalent mass average molecular weight. The measurement method is as below. First, 50 mg of a sample was dissolved in 10 ml of tetrahydrofuran (THF). The obtained solution was filtered through a 0.45-μm nonaqueous chromatodisc. The obtained filtrate was analyzed by GPC to determine the PS-equivalent mass average molecular weight. The analysis condition for GPC was as below.

GPC apparatus: trade name "Gel permeation chromatograph HLC-8020" manufactured by Tosoh Corporation Column: trade name "TSKgel GMH XL-L" (a diameter of 7.8 mm, a length of 30 cm) manufactured by Tosoh Corporation. Two columns were connected.

Column temperature: 40° C.

Carrier gas: tetrahydrofuran (THF)

Carrier gas flow rate: 1 mL/min

Injector and pump temperature: 35° C.

Detector: RI (refractive index detector)

Injection volume: 100 μL

Standard polystyrene for calibration curve for determination of PS-equivalent mass average molecular weight: trade name "shodex" (mass average molecular weight: 1,030,000) manufactured by Showa. Denko K. K. and standard polystyrene for calibration curve (mass average molecular weight: 5,480,000, 3,840,000, 355,000, 102,000, 37,900, 9,100, 2,630, 870) manufactured by Tosoh Corporation

[Measurement Methods of Volume Average Particle Diameters of Seed Particles and Resin Particles and Variation Coefficient of Resin Particles]

In Examples and Comparative Examples below, the volume average particle diameters of seed particles and resin particles were determined as below. In other words, the volume average particle diameters of seed particles and resin particles were determined with a laser diffraction scattering particle size distribution analyzer "LS230" manufactured by Beckman Coulter, Inc. Specifically, 0.1 g of particles to be analyzed (seed particles or resin particles) were placed in a test tube, then 10 ml of an aqueous solution of 0.1% by mass of a nonionic surfactant (polyoxyethylene sorbitan monolaurate (an ethylene oxide addition mole number of 20), trade name "RHEODOL TW-L120", manufactured by Kao Corporation) was added to the particles to be analyzed, and the aqueous solution and the particles to be analyzed were mixed with Touch Mixer "MT-31" manufactured by Yamato Scientific Co., Ltd. for two seconds. Next, the test tube was placed in a desktop ultrasonic cleaner "VS-150" manufactured by VELVO-CLEAR as a commercially available ultrasonic cleaner, and the test tube was sonicated with the ultrasonic cleaner for 10 minutes to disperse the particles to be analyzed in the aqueous solution, thereby yielding a dispersion liquid.

The volume average particle diameter and the standard deviation of the volumetric particle size distribution of the particles to be analyzed contained in the obtained dispersion liquid were determined with a laser diffraction scattering particle size distribution analyzer "LS230" manufactured by Beckman Coulter, Inc. The laser diffraction scattering particle size distribution analyzer shows the measured value of arithmetic mean of volume average particle diameter (arithmetic mean value of volumetric particle size distribution) as the measured value of the volume average particle diameter. Here, the measured value of arithmetic mean of volume average particle diameter of the particles to be analyzed is thus regarded as the measured value of volume average particle diameter of the particles to be analyzed. The variation coefficient of particle diameter of particles to be analyzed was calculated in accordance with the mathematical formula below.

Variation coefficient of particle diameter of particles to be analyzed=(standard deviation of volumetric particle size distribution of particles to be analyzed/volume average particle diameter of particles to be analyzed)×100

The laser diffraction scattering particle size distribution analyzer calculates the volume average particle diameter and the particle size distribution of particles by analyzing spatial intensity distribution data of diffraction and scattering light of the particles with an optical model corresponding to the refractive index of the particles to be analyzed and thus necessitates the input of a refractive index of the particles to be analyzed. Here, as the refractive index of particles to be analyzed used for the data analysis, an estimate value of the refractive index was input to the laser diffraction scattering particle size distribution analyzer. When a single type of vinyl monomer was used for the production of particles to be analyzed, the refractive index of a homopolymer of the vinyl monomer was used as the estimate value of the refractive index of the particles to be analyzed. When a plurality types of vinyl monomers were used for the production of particles to be analyzed, the weighted average of the refractive indexes of homopolymers of the vinyl monomers in terms of the amount of the vinyl monomers was used as the estimate value of the refractive index of the particles to be analyzed.

[Measurement Method of Volume Average Particle Diameter of Resin Particle Aggregate]

In Examples and Comparative Examples below, the volume average particle diameter of a resin particle aggregate was determined as below. In other words, the volume average particle diameter of a resin particle aggregate was determined with a laser diffraction scattering particle size distribution analyzer "LS230" manufactured by Beckman Coulter, Inc. Specifically, 0.1 g of particles (seed particles or resin particles) were placed in a test tube, then 10 ml of an aqueous solution of 0.1% by mass of a nonionic surfactant (polyoxyethylene sorbitan monolaurate (an ethylene oxide addition mole number of 20), trade name "RHEODOL TW-L120", manufactured by Kao Corporation) was added to the resin particle aggregate, and the aqueous solution and the resin particle aggregate were mixed with Touch Mixer "MT-31" manufactured by Yamato Scientific Co., Ltd. for two seconds, thus yielding a mixed solution.

The volume average particle diameter of the particles contained in the obtained mixed solution was determined with a laser diffraction scattering particle size distribution analyzer "LS230" manufactured by Beckman Coulter, Inc. The laser diffraction scattering particle size distribution analyzer shows the measured value of arithmetic mean of volume average particle diameter as the measured value of the volume average particle diameter. Here, the measured value of arithmetic mean of volume average particle diameter of the resin particle aggregate is thus regarded as the measured value of volume average particle diameter of the resin particle aggregate.

An estimate value of the refractive index of resin particles was input to the laser diffraction scattering particle size distribution analyzer, and the laser diffraction scattering particle size distribution analyzer analyzed the data with an optical model corresponding to the refractive index of the resin particles. The estimate value of the refractive index of the resin particles was calculated from the refractive index of a homopolymer of at least one vinyl monomer, as described above.

[Measurement Method of Evaluation Value for Evaluating Dispersibility of Resin Particle Aggregate]

In Examples and Comparative Examples below, as two evaluation values for evaluating the dispersibility of a resin particle aggregate into primary particles or a similar state, the ratio D2/D1 of the volume average particle diameter D2 of particles contained in a dispersion liquid (hereinafter, called "resin particle aggregate dispersion liquid") in which a resin particle aggregate is dispersed in water with respect to the volume average particle diameter D1 of the resin particles and the ratio of particles having a particle diameter larger than the volume average particle diameter D3 of the resin particle aggregate with respect to the particles contained in the resin particle aggregate dispersion liquid were determined as follows.

In other words, 0.50 g of a resin particle aggregate was added to 50 g of water, and the mixture of the water and the resin particle aggregate was sonicated with an ultrasonic disperser "BRANSON SONIFIER 450" manufactured by BRANSON (an output power of 400 W, a frequency of 20 kHz) for 10 minutes, thereby yielding a resin particle aggregate dispersion liquid.

The volume average particle diameter D2 and the volumetric particle size distribution, of the particles contained in the resin particle aggregate dispersion liquid obtained here were determined with a laser diffraction scattering particle size distribution analyzer "LS230" manufactured by Beckman Coulter, Inc. An estimate value of the refractive index of the resin particles was input to the laser diffraction scattering particle size distribution analyzer, and the laser diffraction scattering particle size distribution analyzer analyzed the data with an optical model corresponding to the refractive index of the resin particles. The estimate value of the refractive index of the resin particles was calculated from the refractive index of a homopolymer of at least one vinyl monomer, as described above.

Next, from the volume average particle diameter D2 determined here of the particles contained in the resin particle aggregate dispersion liquid and the volume average particle diameter D1 determined by the measurement method above of the resin particles, the ratio D2/D1 of the volume average particle diameter D2 of the particles contained in the resin particle aggregate dispersion liquid with respect to the volume average particle diameter D1 of the resin particles was calculated. From the volumetric particle size distribution determined here of the particles contained in the resin particle aggregate dispersion liquid and the volume average particle diameter D3 determined by the measurement method above of the resin particle aggregate, the ratio of particles having a particle diameter larger than the volume average particle diameter D3 of the resin particle aggregate with respect to the particles contained in the resin particle aggregate dispersion liquid (hereinafter also called "dispersibility evaluation value") was calculated. A resin particle aggregate having a ratio D2/D1 of 15 or less can be evaluated to have good dispersibility to primary particles or a similar state. A resin particle aggregate having a dispersibility evaluation value of 1% by volume or less can also be evaluated to have good dispersibility to primary particles or a similar state.

[Measurement Method of Total light transmittance and Haze of Molded Article]

In Examples and Comparative Examples below; the total light transmittance of a molded article was determined with a haze meter "NDH 2000" manufactured by NIPPON DENSHOKU INDUSTRIES CO., LTD. in accordance with HS K7361 (Plastics—Determination of the total luminous transmittance of transparent materials—Part 1 Single beam instrument). In Examples and Comparative Examples below, the haze of a molded article was determined with a haze meter "NDH 2000" manufactured by NIPPON DENSHOKU INDUSTRIES CO., LTD. in accordance with MS K7136-1 (Plastic—Determination of haze for transparent materials). Specifically, NDH-2000 manufactured by NIPPON DENSHOKU INDUSTRIES CO., LTD. is used for the measurement. A molded article having a haze of 99% or more has high light diffusion properties, and thus the molded article is excellent in hiding of a light source, for example, when mounted in a liquid crystal backlight unit and when attached to a lighting device as a lighting cover. Thus, the molded article preferably has a haze of 99% or more.

Example 1

Production of Seed Particles

First, 250 g of methyl methacrylate as a monofunctional vinyl monomer (first vinyl monomer) and 5 g of n-octyl mercaptan as a chain transfer agent were mixed to give 255 g of a monomer mixture. Separately, 1.5 g of potassium persulfate as a polymerization initiator was dissolved in 18.5 g of deionized water as an aqueous medium to give 20 g of an aqueous potassium persulfate solution.

Next, in a polymerization vessel equipped with a stirrer and a thermometer, 1,000 g of deionized water as an aqueous medium was placed, and 255 g of the monomer mixture was fed to the polymerization vessel. Subsequently, while the contents in the polymerization vessel were stirred with the stirrer, air in the polymerization vessel was replaced with nitrogen, and the temperature in the polymerization vessel was raised to 70° C. While the stirring was further continued and the temperature in the polymerization vessel was kept at 70° C., 20 g of the aqueous potassium persulfate solution as a polymerization initiator was added to the contents in the polymerization vessel, and then the mixture was polymerized over 10 hours.

This yielded an emulsion containing seed particles (polymethyl methacrylate particles). The seed particles contained in the obtained emulsion had a volume average particle diameter of 0.38 μm. The seed particles contained in the obtained emulsion had a mass average molecular weight (Mw) of 15,300.

(Production of Resin Particles)

First, 8 g of dioctyl sodium sulfosuccinate as a surfactant was dissolved in 782 g of deionized water as an aqueous medium to give 800 g of an aqueous surfactant solution. Separately, 224 g of n-butyl acrylate as a monofunctional vinyl monomer (second vinyl monomer), 96 g of ethylene glycol dimethacrylate (28% by mass relative to the total mass of the resin particles) as a cross-linkable monomer (second vinyl monomer), 3.2 g of n-dodecyl mercaptan as a chain transfer agent, and 1.6 g of 2,2'-azobisisobutyronitrile as a polymerization initiator were mixed to give 324.8 g of a monomer mixed solution.

Next, in a polymerization vessel equipped with a stirrer and a thermometer, 800 g of the aqueous surfactant solution was placed, and then 324.8 g of the monomer mixed solution was placed in the polymerization vessel. The contents in the polymerization vessel were then stirred with a high-speed emulsifier/disperser "T. K. HOMO MIXER" manufactured by PRIMIX Corporation to give a dispersion liquid. At this time, controlling the stirring adjusted the diameter of droplets in the dispersion liquid (droplets in the mixed solution) to give a dispersion liquid containing the droplets having a diameter of about 5 μm.

Furthermore, 80 g of the emulsion containing the seed particles was added to the dispersion liquid, and this allowed the seed particles to absorb the monomer mixed solution. Next, while the contents in the polymerization vessel were stirred with the stirrer under a stream of nitrogen, the temperature in the polymerization vessel was raised to 50° C. and maintained at 50° C. for 5 hours, and thus the contents were polymerized over 5 hours. The temperature in the polymerization vessel was then lowered to room temperature (about 25° C.). This yielded a slurry containing resin particles.

The obtained slurry was passed through a stainless-steel wire mesh having an opening of 20 μm to classify the resin particles, and thus a slurry containing the classified resin particles was obtained.

The resin particles contained in the obtained slurry had a volume average particle diameter D1 of 1.1 μm, and the resin particles contained in the obtained slurry had a variation coefficient of particle diameter of 12.5%. The obtained slurry had a solid concentration of 28% by mass and contained the surfactant in an amount of 2.3 parts by mass relative to 100 parts by mass of the resin particles.

(Production of Resin Particle Aggregate)

The slurry containing the resin particles was spray-dried with a spray dryer (Type: atomizer system and take-up system, Model: TRS-3WK) manufactured by Sakamotogiken Co., LTD. as a spray drying apparatus in a condition of a slurry supply speed of 25 ml/mm, an atomizer rotation speed of 11,000 rpm, an air flow of 2 $m^3$/min, an inlet temperature (temperature of a slurry inlet that is provided on the spray dryer and through which a slurry is sprayed and introduced) of 150° C., and an outlet temperature (temperature of a powder outlet that is provided, on the spray dryer and through which a resin particle aggregate is discharged) of 70° C., thereby yielding a resin particle aggregate.

The obtained resin particle aggregate had an estimate value of refractive index of 1.48. The obtained resin particle aggregate had a volume average particle diameter D3 of 52 μm. The obtained resin particle aggregate contained no inorganic component.

Subsequently, the evaluation values of the resin particle aggregate were determined in order to evaluate the dispersibility of the resin particle aggregate. As a result, the particles contained in the resin particle aggregate dispersion liquid had a volume average particle diameter D2 of 6.5 μm, the ratio D2/D1 of the volume average particle diameter D2 of the particles contained in the resin particle aggregate dispersion liquid with respect to the volume average particle diameter D1 of the resin particles was 5.9, and the ratio of particles having a particle diameter larger than the volume average particle diameter D3 (=52 μm) of the resin particle aggregate with respect to the particles contained in the resin particle aggregate dispersion liquid was 0.0% by volume.

(Production of Molded Article)

Into an extruder, 100 parts by mass of polystyrene ("TOYO STYROL (registered trademark) GP G200C" manufactured by TOYO STYRENE Co., Ltd.) as a transparent base resin and 1 part by mass of the resin particle aggregate were supplied, and the whole was melted and kneaded at 230° C. in the extruder and then was pelletized. The obtained pellets were molded with an injection molding machine in a condition of a cylinder temperature of 230° C. and a residence time of 10 minutes, thus yielding a plate-like molded article (light diffusion plate) having a thickness of 2 mm, a width of 50 trim, and a length of 100 mm as a molded article made of the light diffusible resin composition. The obtained molded article had a total light transmittance of 65%, and the obtained molded article had a haze of 99%.

Example 2

Production of Seed Particles

The seed particles produced in Example 1 were used.
(Production of Resin Particles)

First, 6 g of dioctyl sodium sulfosuccinate as a surfactant was dissolved in 894 g of deionized water as an aqueous medium to give 900 g of an aqueous surfactant solution. Separately, 180 g of n-butyl acrylate as a monofunctional vinyl monomer (second vinyl monomer), 120 g of ethylene glycol dimethacrylate (38% by mass relative to the total mass of the resin particles) as a cross-linkable monomer (second vinyl monomer), 3 g of n-dodecyl mercaptan as a chain transfer agent, and 2 g of 2,2'-azobisisobutyronitrile as a polymerization initiator were mixed to give 305 g of a monomer mixed solution.

Next, in a polymerization vessel equipped with a stirrer and a thermometer, 900 g of the aqueous surfactant solution was placed, and then 305 g of the monomer mixed solution was placed in the polymerization vessel. The contents in the polymerization vessel were then stirred with a high-speed emulsifier/disperser "T. K. HOMO MIXER" manufactured by PRIMIX Corporation to give a dispersion liquid. At this time, controlling the stirring adjusted the diameter of droplets in the dispersion liquid (droplets in the mixed solution) to give a dispersion liquid containing the droplets having a diameter of about 5 μm.

Furthermore, 60 g of the emulsion containing the seed particles was added to the dispersion liquid, and this allowed the seed particles to absorb the monomer mixed solution. Next, while the contents in the polymerization vessel were stirred with the stirrer under a stream of nitrogen, the temperature in the polymerization vessel was raised to 50° C. and maintained at 50° C. for 10 hours, and thus the contents were polymerized over 10 hours. The temperature in the polymerization vessel was then lowered to room temperature (about 25° C.). This yielded a slurry containing resin particles.

The obtained slurry was passed through a stainless-steel wire mesh having an opening of 20 μm to classify the resin particles, and thus a slurry containing the classified resin particles was obtained.

The resin particles contained in the obtained slurry had a volume average particle diameter D1 of 1.2 urn, and the resin particles contained in the obtained slurry had a variation coefficient of particle diameter of 17.3%. The obtained slurry had a solid concentration of 25% by mass and contained the surfactant in an amount of 1.9 parts by mass relative to 100 parts by mass of the resin particles.

(Production of Resin Particle Aggregate)

A resin particle aggregate was produced in a similar condition to that in Example 1 except that the resin particles obtained in Example 2 were used in place of the resin particles of Example 1.

The obtained resin particle aggregate had an estimate value of refractive index of 1.49. The obtained resin particle aggregate had a volume average particle diameter D3 of 55 μm. The obtained resin particle aggregate contained no inorganic component.

Subsequently, the evaluation values of the resin particle aggregate were determined in order to evaluate the dispersibility of the resin particle aggregate. As a result, the particles contained in the resin particle aggregate dispersion liquid had a volume average particle diameter D2 of 5.7 μm, the ratio D2/D1 of the volume average particle diameter D2 of the particles contained in the resin particle aggregate dispersion liquid with respect to the volume average particle diameter D1 of the resin particles was 4.8, and the ratio of particles having a particle diameter larger than the volume average particle diameter D3 (=55 μm) of the resin particle aggregate with respect to the particles contained in the resin particle aggregate dispersion liquid was 0.0% by volume.

(Production of Molded Article)

A molded article made of the light diffusible resin composition was produced in a similar condition to that in Example 1 except that the resin particle aggregate obtained in Example 2 was used in place of the resin particle aggregate of Example 1. The obtained molded article had a total light transmittance of 67%, and the obtained molded article had a haze of 99%.

Example 3

Production of Seed Particles

First, 250 g of styrene as a monofunctional vinyl monomer (first vinyl monomer) and 5 g of α-methylstyrene dimer as a chain transfer agent were mixed to give 255 g of a monomer mixture. Separately, 1.5 g of potassium persulfate as a polymerization initiator was dissolved in 18.5 g of deionized water as an aqueous medium to give 20 g of an aqueous potassium persulfate solution.

Next, in a polymerization vessel equipped with a stirrer and a thermometer, 1,000 g of deionized water as an aqueous medium was placed, and 255 g of the monomer mixture was fed to the polymerization vessel. Subsequently, while the contents in the polymerization vessel were stirred with the stirrer, air in the polymerization vessel was replaced with nitrogen, and the temperature in the polymerization vessel was raised to 70° C. While the stirring was further continued and the temperature in the polymerization vessel was kept at 70° C., 20 g of the aqueous potassium persulfate solution as a polymerization initiator was added to the contents in the polymerization vessel, and then the mixture was polymerized over 24 hours.

This yielded an emulsion containing seed particles (polystyrene particles), The seed particles contained in the obtained emulsion had a volume average particle diameter of 0.40 μm. The seed particles contained in the obtained emulsion had a mass average molecular weight (Mw) of 13,500.

(Production of Resin Particles)

First, 6 g of sodium polyoxyethylene alkylphenyl ether phosphate as a surfactant was dissolved in 894 g of deionized water as an aqueous medium to give 900 g of an aqueous surfactant solution. Separately, 270 g of styrene as a monofunctional vinyl monomer (second vinyl monomer), 30 g of ethylene glycol dimethacrylate (9.6% by mass relative to the total mass of the resin particles) as a cross-linkable monomer (second vinyl monomer), and 1.5 g of 2,2'-azobis(2,4-dimethylvaleronitrile) as a polymerization initiator were mixed to give 301.5 g of a monomer mixed solution.

Next, in a polymerization vessel equipped with a stirrer and a thermometer, 900 g of the aqueous surfactant solution was placed, and then 301.5 g of the monomer mixed solution was placed in the polymerization vessel. The contents in the polymerization vessel were then stirred with a high-speed emulsifier/disperser "T. K. HOMO MIXER" manufactured by PRIMIX Corporation to give a dispersion liquid. At this time, controlling the stirring adjusted the diameter of droplets in the dispersion liquid (droplets in the mixed solution) to give a dispersion liquid containing the droplets having a diameter of about 5 µm.

Furthermore, 60 g of the emulsion containing the seed particles was added to the dispersion liquid, and this allowed the seed particles to absorb the monomer mixed solution. Next, while the contents in the polymerization vessel were stirred with the stirrer under a stream of nitrogen, the temperature in the polymerization vessel was raised to 50° C. and maintained at 50° C. for 5 hours, and thus the contents were polymerized over 5 hours. The temperature in the polymerization vessel was then lowered to room temperature (about 25° C.). This yielded a slurry containing resin particles.

The obtained slurry was passed through a stainless-steel wire mesh having an opening of 20 µm to classify the resin particles, and thus a slurry containing the classified resin particles was obtained.

The resin particles contained in the obtained slurry had a volume average particle diameter D1 of 1.2 µm, and the resin particles contained in the obtained slurry had a variation coefficient of particle diameter of 11.3%. The obtained slurry had a solid concentration of 25% by mass and contained the surfactant in an amount of 1.9 parts by mass relative to 100 parts by mass of the resin particles.

(Production of Resin Particle Aggregate)

The slurry containing the resin particles was spray-dried with a spray dryer (Type: atomizer system and take-up system, Model: TRS-3WK) manufactured by Sakamotogiken Co., LTD. as a spray drying apparatus in a condition of a slurry supply speed of 25 ml/min, an atomizer rotation speed of 15,000 rpm, an air flow of 2 m$^3$/min, an inlet temperature (temperature of a slurry inlet) of 180° C., and an outlet temperature (temperature of a powder outlet) of 90° C., thereby yielding a resin particle aggregate.

The obtained resin particle aggregate had an estimate value of refractive index of 1.58. The obtained resin particle aggregate had a volume average particle diameter D3 of 53 µm. The obtained resin particle aggregate contained no inorganic component.

Subsequently, the evaluation values of the resin particle aggregate were determined in order to evaluate the dispersibility of the resin particle aggregate. As a result, the particles contained in the resin particle aggregate dispersion liquid had a volume average particle diameter D2 of 6.3 µm, the ratio D2/D1 of the volume average particle diameter D2 of the particles contained in the resin particle aggregate dispersion liquid with respect to the volume average particle diameter D1 of the resin particles was 5.3, and the ratio of particles having a particle diameter larger than the volume average particle diameter D3 (=53 µm) of the resin particle aggregate with respect to the particles contained in the resin particle aggregate dispersion liquid was 0.0% by volume.

(Production of Molded Article)

A molded article made of the light diffusible resin composition was produced in a similar condition to that in Example 1 except that the resin particle aggregate obtained in Example 3 was used in place of the resin particle aggregate of Example 1 and polymethyl methacrylate (Sumipex EXA, manufactured by Sumitomo Chemical Co., Ltd.) was used as the transparent base resin in place of polystyrene. The obtained molded article had a total light transmittance of 66%, and the obtained molded article had a haze of 99%.

Example 4

Production of Seed Particles

The seed particles produced in Example 3 were used.

(Production of Resin Particles)

First, 4 g of dioctyl sodium sulfosuccinate and 4 g of sodium polyoxyethylene alkylphenyl ether phosphate as surfactants were dissolved in 792 g of deionized water to give 800 g of an aqueous surfactant solution. Separately, 350 g of styrene as a monofunctional vinyl monomer (second vinyl monomer), 50 g of divinylbenzene (12% by mass relative to the total mass of the resin particles) as a crosslinkable monomer (second vinyl monomer), and 2 g of benzoyl peroxide as a polymerization initiator were mixed to give 402 g of a monomer mixed solution.

Next, in a polymerization vessel equipped with a stirrer and a thermometer, 800 g of the aqueous surfactant solution was placed, and then 402 g of the monomer mixed solution was placed in the polymerization vessel. The contents in the polymerization vessel were then stirred with a high-speed emulsifier/disperser "T. K. HOMO MIXER" manufactured by PRIMIX Corporation to give a dispersion liquid. At this time, controlling the stirring adjusted the diameter of droplets in the dispersion liquid (droplets in the mixed solution) to give a dispersion liquid containing the droplets having a diameter of about 5 µm.

Furthermore, 100 g of the emulsion containing the seed particles was added to the dispersion liquid, and this allowed the seed particles to absorb the monomer mixed solution. Next, while the contents in the polymerization vessel were stirred with the stirrer under a stream of nitrogen, the temperature in the polymerization vessel was raised to 75° C. and maintained at 75° C. for 5 hours, and thus contents were polymerized over 5 hours. The temperature in the polymerization vessel was then lowered to room temperature (about 25° C.). This yielded a slurry containing resin particles.

The obtained slurry was passed through a stainless-steel wire mesh having an opening of 20 µm to classify the resin particles, and thus a slurry containing the classified resin particles was obtained.

The resin particles contained in the obtained slurry had a volume average particle diameter D1 of 1.1 µm, and the resin particles contained in the obtained slurry had a variation coefficient of particle diameter of 13.7%. The obtained slurry had a solid concentration of 32% by mass and contained the surfactant in an amount of 1.9 parts by mass relative to 100 parts by mass of the resin particles.

(Production of Resin Particle Aggregate)

A resin particle aggregate was obtained in a similar condition to that in Example 3 except that the resin particles obtained in Example 4 were used in place of the resin particles of Example 3.

The obtained resin particle aggregate had an estimate value of refractive index of 1.59. The obtained resin particle aggregate had a volume average particle diameter D3 of 52 µm. The obtained resin particle aggregate contained no inorganic component.

Subsequently, the evaluation values of the resin particle aggregate were determined in order to evaluate the dispersibility of the resin particle aggregate. As a result, the particles contained in the resin particle aggregate dispersion liquid had a volume average particle diameter D2 of 5.8 µm, the ratio D2/D1 of the volume average particle diameter D2 of the particles contained in the resin particle aggregate dispersion liquid with respect to the volume average particle diameter D1 of the resin particles was 5.3, and the ratio of particles having a particle diameter larger than the volume average particle diameter D3 (=52 μm) of the resin particle aggregate with respect to the particles contained in the resin particle aggregate dispersion liquid was 0.0% by volume.

(Production of Molded Article)

Into an extruder, 100 parts by mass of polystyrene ("TOYO STYROL (registered trademark) GP G200C" manufactured by TOYO STYRENE Co., Ltd.) as a transparent base resin and 50 parts by mass of the resin particle aggregate were supplied, and the whole was melted and kneaded at 230° C. in the extruder and then was pelletized. Next, 3 parts by mass of the obtained pellets and 98 parts by mass of polystyrene were mixed, and the obtained mixture was molded with an injection molding machine in a condition of a cylinder temperature of 230° C. and a residence time of 10 minutes, thus yielding a plate-like molded article having a thickness of 2 mm, a width of 50 mm, and a length of 100 mm as a molded article made of the light diffusible resin composition. The obtained molded article had a total light transmittance of 65%, and the obtained molded article had a haze of 99%.

Example 5

Production of Seed Particles

First, 200 g of methyl methacrylate as a monofunctional vinyl monomer (first vinyl monomer) and 6 g of n-octyl mercaptan as a chain transfer agent were mixed to give 206 g of a monomer mixture. Separately, 1.5 g of potassium persulfate as a polymerization initiator was dissolved in 18.5 g of deionized water as an aqueous medium to give 20 g of an aqueous potassium persulfate solution.

Next, in a polymerization vessel equipped with a stirrer and a thermometer, 1,000 g of deionized water as an aqueous medium was placed, and 206 g of the monomer mixture was fed to the polymerization vessel. Subsequently, while the contents in the polymerization vessel were stirred with the stirrer, air in the polymerization vessel was replaced with nitrogen, and the temperature in the polymerization vessel was raised to 70° C. While the stirring was further continued and the temperature in the polymerization vessel was kept at 70° C., 20 g of the aqueous potassium persulfate solution as a polymerization initiator was added to the contents in the polymerization vessel, and then the mixture was polymerized over 10 hours.

This yielded an emulsion containing seed particles (polymethyl methacrylate particles). The seed particles contained in the obtained emulsion had a volume average particle diameter of 0.30 μm. The seed particles contained in the obtained emulsion had a mass average molecular weight (Mw) of 12,900.

(Production of Resin Particles)

First, 10 g of dioctyl sodium sulfosuccinate as a surfactant was dissolved in 790 g of deionized water as an aqueous medium to give 800 g of an aqueous surfactant solution. Separately, 240 g of n-butyl acrylate as a monofunctional vinyl monomer (second vinyl monomer), 160 g of ethylene glycol dimethacrylate (49% by mass relative to the total mass of the resin particles) as a cross-linkable monomer (second vinyl monomer), 4 g of n-dodecyl mercaptan as a chain transfer agent, and 2 g of 2,2'-azobis(2,4-dimethylvaleronitrile) as a polymerization initiator were mixed to give 306 g of a monomer mixed solution.

Next, in a polymerization vessel equipped with a stirrer and a thermometer, 800 g of the aqueous surfactant solution was placed, and next 306 g of the monomer mixed solution was placed in the polymerization vessel to give a mixture. The obtained mixture was then stirred with a high-speed emulsifier/disperser "T. K. HOMO MIXER" manufactured by PRIMIX Corporation to give a dispersion liquid. At this time, controlling the stirring adjusted the diameter of droplets in the dispersion liquid (droplets in the mixed solution) to give a dispersion liquid containing the droplets having a diameter of about 5 μm.

Furthermore, 120 g of the emulsion containing the seed particles was added to the dispersion liquid, and this allowed the seed particles to absorb the monomer mixed solution. Next, while the contents in the polymerization vessel were stirred with the stirrer under a stream of nitrogen, the temperature in the polymerization vessel was raised to 50° C. and maintained at 50° C. for 5 hours, and thus the contents were polymerized over 5 hours. The temperature in the polymerization vessel was then lowered to room temperature (about 25° C.). This yielded a slurry containing resin particles.

The obtained slurry was passed through a stainless-steel wire mesh having an opening of 20 μm to classify the resin particles, and thus a slurry containing the classified resin particles was obtained.

The resin particles contained in the obtained slurry had a volume average particle diameter D1 of 0.86 μm, and the resin particles contained in the obtained slurry had a variation coefficient of particle diameter of 14.1%. The obtained slurry had a solid concentration of 27% by mass and contained the surfactant in an amount of 3.1 parts by mass relative to 100 parts by mass of the resin particles.

(Production of Resin Particle Aggregate)

The slurry containing the resin particles was spray-dried with a spray dryer (Type: atomizer system and take-up system, Model: TRS-3WK) manufactured by Sakamotogiken Co., LTD. as a spray drying apparatus in a condition of a slurry supply speed of 25 ml/min, an atomizer rotation speed of 13,000 rpm, an air flow of 2 m$^3$/min, an inlet temperature (temperature of a slurry inlet) of 150° C., and an outlet temperature (temperature of a powder outlet) of 70° C., thereby yielding a resin particle aggregate.

The obtained resin particle aggregate had an estimate value of refractive index of 1.48. The obtained resin particle aggregate had a volume average particle diameter D3 of 52 μm. The obtained resin particle aggregate contained no inorganic component.

Subsequently, the evaluation values of the resin particle aggregate were determined in order to evaluate the dispersibility of the resin particle aggregate. As a result, the particles contained in the resin particle aggregate dispersion liquid had a volume average particle diameter D2 of 5.7 μm, the ratio D2/D1 of the volume average particle diameter D2 of the particles contained in the resin particle aggregate dispersion liquid with respect to the volume average particle diameter D1 of the resin particles was 6.6, and the ratio of particles having a particle diameter larger than the volume average particle diameter D3 (=52 μm) of the resin particle aggregate with respect to the particles contained in the resin particle aggregate dispersion liquid was 0.0% by volume.

The obtained resin particle aggregate was observed under SEM to give an SEM image shown in FIG. 1. FIG. 1 reveals that the obtained resin particle aggregate was a resin particle aggregate having a spherical outer shape. The observation of the resin particle aggregate under TEM revealed that the obtained resin particle aggregate was present as a homogeneous mixture of the seed particle component and the polymerized component of the monomer mixed solution and had a single structure. Thus, the obtained resin particle aggregate was not a core-shell type particle and did not have a graded structure in which compositions gradually change from the center toward the outside. From these results, it is supposed that the obtained resin particle aggregate is not a core-shell type particle that includes a core and a shell having different refractive indexes from each other, does not have a graded structure in which the refractive index gradually changes from the center toward the outside, and has a uniform refractive index.

(Production of Molded Article)

A molded article made of the light diffusible resin composition was produced in a similar condition to that in Example 1 except that the resin particle aggregate obtained in Example 5 was used in place of the resin particle aggregate of Example 1. The obtained molded article had a total light transmittance of 63%, and the obtained molded article had a haze of 99%.

Example 6

Production of Seed Particles

The seed particles produced in Example 5 were used.

(Production of Resin Particles)

First, 3 g of dioctyl sodium sulfosuccinate as a surfactant was dissolved in 597 g of deionized water to give 600 g of an aqueous surfactant solution. Separately, 160 g of methyl methacrylate as a monofunctional vinyl monomer (second vinyl monomer), 40 g of ethylene glycol dimethacrylate (18% by mass relative to the total mass of the resin particles) as a cross-linkable monomer (second vinyl monomer), 2 g of n-dodecyl mercaptan as a chain transfer agent, and 1.5 g of 2,2'-azobis(2,4-dimethylvaleronitrile) as a polymerization initiator were mixed to give 203.5 g of a monomer mixed solution.

Next, in a polymerization vessel equipped with a stirrer and a thermometer, 600 g of the aqueous surfactant solution was placed, and then 203.5 g of the monomer mixed solution was placed in the polymerization vessel. The contents in the polymerization vessel were then stirred with a high-speed emulsifier/disperser "T. K. HOMO MIXER" manufactured by PRIMIX Corporation to give a dispersion liquid. At this time, controlling the stirring adjusted the diameter of droplets in the dispersion liquid (droplets in the mixed solution) to give a dispersion liquid containing the droplets having a diameter of about 5 μm.

Furthermore, 100 g of the emulsion containing the seed particles was added to the dispersion liquid, and this allowed the seed particles to absorb the monomer mixed solution. Next, while the contents in the polymerization vessel were stirred with the stirrer under a stream of nitrogen, the temperature in the polymerization vessel was raised to 50° C. and maintained at 50° C. for 10 hours, and thus the contents were polymerized over 10 hours. The temperature in the polymerization vessel was then lowered to room temperature (about 25° C.). This yielded a slurry containing resin particles.

The obtained slurry was passed through a stainless-steel wire mesh having an opening of 20 μm to classify the resin particles, and thus a slurry containing the classified resin particles was obtained.

The resin particles contained in the obtained slurry had a volume average particle diameter D1 of 0.62 μm, and the resin particles contained in the obtained slurry had a variation coefficient of particle diameter of 17.9%. The Obtained slurry had a solid concentration of 24% by mass and contained the surfactant in an amount of 1.4 parts by mass relative to 100 parts by mass of the resin particles.

(Production of Resin Particle Aggregate)

The slurry containing the resin particles was spray-dried with a spray dryer (Type: atomizer system and take-up system, Model: TRS-3WK) manufactured by Sakamotogiken Co., LTD. as a spray drying apparatus in a condition of a slurry supply speed of 25 ml/min, an atomizer rotation speed of 13,000 rpm, an air flow of 2 m$^3$/min, an inlet temperature (temperature of a slurry inlet) of 170° C., and an outlet temperature (temperature of a powder outlet) of 90° C., thereby yielding a resin particle aggregate. The obtained resin particle aggregate had an estimate value of refractive index of 1.49. The obtained resin particle aggregate had a volume average particle diameter D3 of 50 μm. The obtained resin particle aggregate contained no inorganic component.

Subsequently, the evaluation values of the resin particle aggregate were determined in order to evaluate the dispersibility of the resin particle aggregate. As a result, the particles contained in the resin particle aggregate dispersion liquid had a volume average particle diameter D2 of 6.6 μm, the ratio D2/D1 of the volume average particle diameter D2 of the particles contained in the resin particle aggregate dispersion liquid with respect to the volume average particle diameter D1 of the resin particles was 10.6, and the ratio of particles having a particle diameter larger than the volume average particle diameter D3 (=50 μm) of the resin particle aggregate with respect to the particles contained in the resin particle aggregate dispersion liquid was 0.0% by volume.

Figure 2:
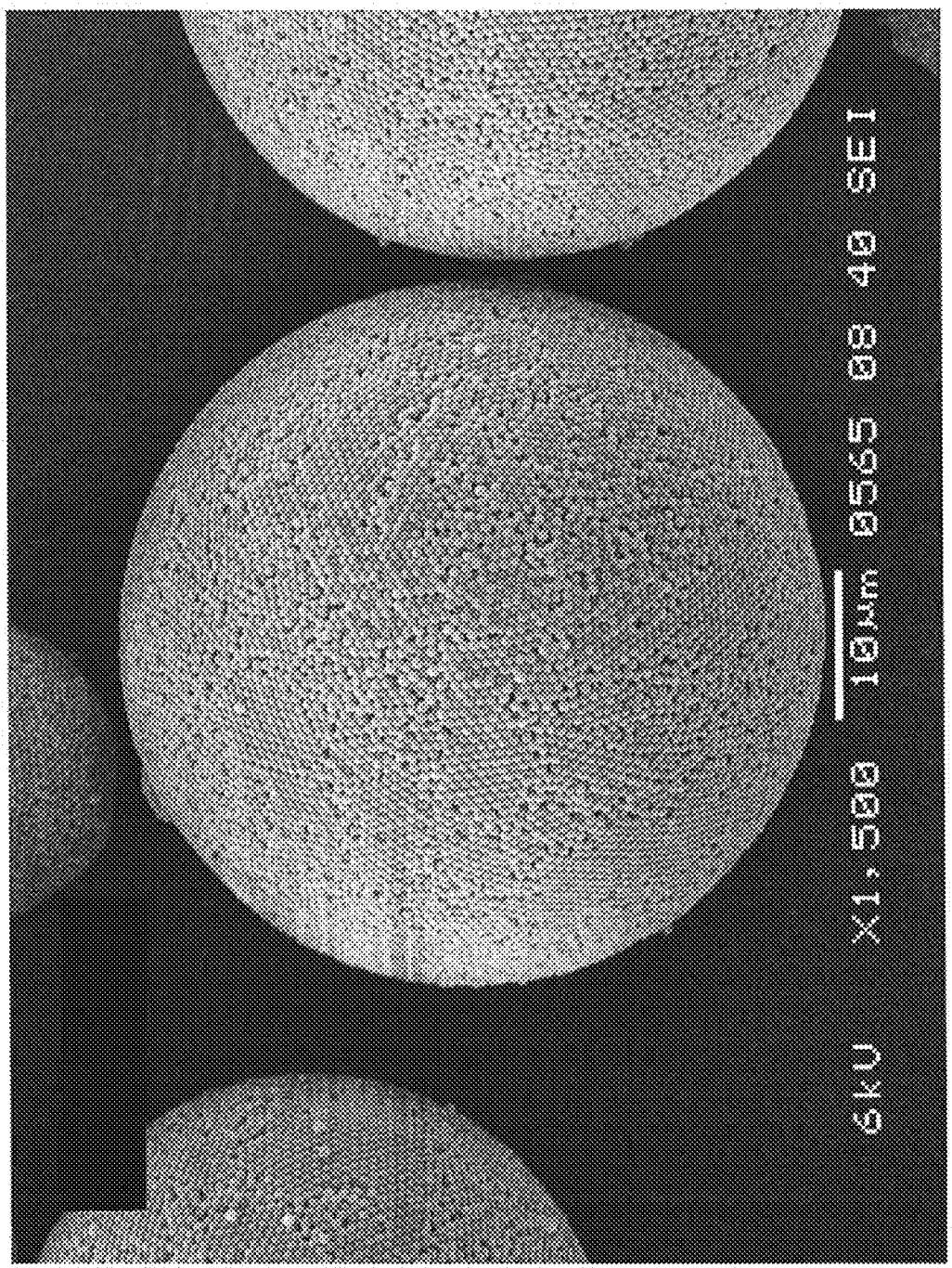
FIG. 2 is an SEM image of a resin particle aggregate pertaining to another example of the present invention.

The obtained resin particle aggregate was observed under SEM to give an SEM image shown in FIG. 2. FIG. 2 reveals that the obtained resin particle aggregate was a resin particle aggregate having a spherical outer shape.

(Production of Molded Article)

A molded article was produced in a similar condition to that in Example 1 except that the resin particle aggregate obtained in Example 6 was used and polycarbonate (Panlite, manufactured by Teijin Chemicals Ltd.) was used as the base resin. The total light transmittance and the haze of the obtained molded article were determined. Table 1 shows the results.

A molded article including the light diffusible resin composition was produced in a similar condition to that in Example 1 except the resin particle aggregate obtained in Example 6 was used in place of the resin particle aggregate of Example 1 and polycarbonate ("Panlite", manufactured by Teijin Chemicals Ltd.) was used as the transparent base resin in place of polystyrene. The obtained molded article had a total light transmittance of 63%, and the obtained molded article had a haze of 99%.

Comparative Example 1

Production of Seed Particles

Seed particles were produced in a similar condition to that in Example 1.

(Production of Resin Particles)

Resin particles were produced in a similar manner to that in Example 1 except that the amount of n-butyl acrylate was changed to 304 g and the amount of ethylene glycol dimethacrylate was changed to 16 g (4.7% by mass relative to the total mass of the resin particles).

The obtained slurry was passed through a stainless-steel wire mesh having an opening of 20 μm to classify the resin particles, and thus a slurry containing the classified resin particles was obtained.

The resin particles contained in the obtained slurry had a volume average particle diameter D1 of 1.2 µm, and the resin particles contained in the obtained slurry had a variation coefficient of particle diameter of 12.0%.

(Production of Resin Particle Aggregate)

A resin particle aggregate was Obtained in a similar condition to that in Example 1 except that the resin particles obtained in Comparative Example 1 were used in place of the resin particles of Example 1. The obtained resin particle aggregate had an estimate value of refractive index of 1.47. The obtained resin particle aggregate had a volume average particle diameter D3 of 52 µm.

Subsequently, the evaluation values of the resin particle aggregate were determined in order to evaluate the dispersibility of the resin particle aggregate. As a result, the particles contained in the resin particle aggregate dispersion liquid had a volume average particle diameter D2 of 34 µm, the ratio D2/D1 of the volume average particle diameter D2 of the particles contained in the resin particle aggregate dispersion liquid with respect to the volume average particle diameter D1 of the resin particles was 28.3, and the ratio of particles having a particle diameter larger than the volume average particle diameter D3 (=52 µm) of the resin particle aggregate with respect to the particles contained in the resin particle aggregate dispersion liquid was 18.2% by volume.

(Production of Molded Article)

A molded article made of the light diffusible resin composition was produced in a similar condition to that in Example 1 except that the resin particle aggregate obtained in Comparative Example 1 was used in place of the resin particle aggregate of Example 1. The obtained molded article had a total light transmittance of 68%, and the obtained molded article had a haze of 98%.

Comparative Example 2

Production of Seed Particles

Seed particles were produced in a similar condition to that in Example 1.

(Production of Resin Particles)

First, 3 g of dioctyl sodium sulfosuccinate as a surfactant was dissolved in 317 g of deionized water to give 320 g of an aqueous surfactant solution. Separately, 224 g of n-butyl acrylate as a monofunctional vinyl monomer (second vinyl monomer), 96 g of ethylene glycol dimethacrylate as a cross-linkable monomer (second vinyl monomer), 3.2 g of n-dodecyl mercaptan as a chain transfer agent, and 1.6 g of 2,2'-azobisisobutyronitrile as a polymerization initiator were mixed to give 324.8 g of a monomer mixed solution.

Next, in a polymerization vessel equipped with a stirrer and a thermometer, 320 g of the aqueous surfactant solution was placed, and then 324.8 g of the monomer mixed solution was placed in the polymerization vessel. The contents in the polymerization vessel were then stirred with a high-speed emulsifier/disperser "T. K. HOMO MIXER" manufactured by PRIMIX Corporation to give a dispersion liquid. At this time, controlling the stirring adjusted the diameter of droplets in the dispersion liquid (droplets in the mixed solution) to give a dispersion liquid containing the droplets having a diameter of about 5 µm.

Furthermore, 80 g of the emulsion containing the seed particles was added to the dispersion liquid, and this allowed the seed particles to absorb the monomer mixed solution. Then, the contents in the polymerization vessel was kept at normal temperature for 3 hours, and then 480 g of an aqueous solution of 3% by mass of polyvinyl alcohol ("GOHSENOL (registered trademark) GL-05" manufactured by The Nippon Synthetic Chemical Industry Co., Ltd.) (previously prepared by dissolving polyvinyl alcohol in water) as a water-soluble polymer was added to the contents in the polymerization vessel. Next, while the contents in the polymerization vessel was stirred with the stirrer under a stream of nitrogen, the temperature in the polymerization vessel was raised to 50° C. and maintained at 50° C. for 5 hours, and thus the contents were polymerized over 5 hours. The temperature in the polymerization vessel was then lowered to room temperature (about 25° C.). This yielded a slurry containing resin particles.

The obtained slurry was passed through a stainless-steel wire mesh having an opening of 20 µm to classify the resin particles, and thus a slurry containing the classified resin particles was obtained.

The resin particles contained in the obtained slurry had a volume average particle diameter D1 of 1.1 µm, and the resin particles contained in the obtained slurry had a variation coefficient of particle diameter of 11.1%. The obtained slurry had a solid concentration of 48% by mass and contained the surfactant in an amount of 0.8 part by mass relative to 100 parts by mass of the resin particles.

(Production of Resin Particle Aggregate)

A resin particle aggregate was produced in a similar condition to that in Example 1 except that the resin particles produced in Comparative Example 2 were used. The obtained resin particle aggregate had an estimate value of refractive index of 1.48. The obtained resin particle aggregate had a volume average particle diameter D3 of 54 µm.

Subsequently, the evaluation values of the resin particle aggregate were determined in order to evaluate the dispersibility of the resin particle aggregate. As a result, the particles contained in the resin particle aggregate dispersion liquid had a volume average particle diameter D2 of 35 µm, the ratio D2/D1 of the volume average particle diameter D2 of the particles contained in the resin particle aggregate dispersion liquid with respect to the volume average particle diameter D1 of the resin particles was 31.8, and the ratio of particles having a particle diameter larger than the volume average particle diameter D3 (=54 µm) of the resin particle aggregate with respect to the particles contained in the resin particle aggregate dispersion liquid was 20.8% by volume.

(Production of Molded Article)

A molded article was produced in a similar condition to that in Example 1 except that the resin particle aggregate produced in Comparative Example 2 was used. The obtained molded article had a total light transmittance of 69%, and the obtained molded article had a haze of 98%.

Comparative Example 3

Production of Seed Particles

Seed particles were produced in a similar condition to that in Example 3.

(Production of Resin Particles)

Polymerization was carried out in a similar manner to that in Example 4 except that the amount of styrene was changed to 160 g and the amount of divinylbenzene was changed to 240 g. As a result, the particles were aggregated during the polymerization and failed to yield resin particles. The SEM observation revealed that particles having a diameter of about 1 µm were fused to each other. On this account, no resin particle aggregate was able to be produced. The volume average particle diameter D1 and variation coefficient of particle diameter of the resin particles were failed to be determined.

Comparative Example 4

Production of Seed Particles

First, 1 g of potassium persulfate as a polymerization initiator was dissolved in 19 g of deionized water as an aqueous medium to give 20 g of an aqueous potassium persulfate solution. In a polymerization vessel equipped with a stirrer and a thermometer, 1,000 g of deionized water as an aqueous medium was placed, and 200 g of methyl methacrylate as a monofunctional vinyl monomer (first vinyl monomer) and 6 g of tert-dodecyl mercaptan as a chain transfer agent were fed to the polymerization vessel. Subsequently, while the contents in the polymerization vessel were stirred with the stirrer, air in the polymerization vessel was replaced with nitrogen, and the temperature in the polymerization vessel was raised to 70° C. While the stirring was further continued and the temperature in the polymerization vessel was kept at 70° C., 20 g of the aqueous potassium persulfate solution as a polymerization initiator was added to the contents in the polymerization vessel, and then the mixture was polymerized over 10 hours.

This yielded an emulsion containing seed particles (polymethyl methacrylate particles). The seed particles contained in the obtained emulsion had a volume average particle diameter of 0.44 µm.

(Production of Resin Particles)

First, 3 g of ammonium polyoxyethylene tridecyl ether sulfate as a surfactant was dissolved in 795 g of deionized water to give 800 g of an aqueous surfactant solution. Separately, 160 g of n-butyl acrylate as a monofunctional vinyl monomer (second vinyl monomer), 40 g of ethylene glycol dimethacrylate as a cross-linkable monomer (second vinyl monomer), and 1 g of 2,2'-azobisisobutyronitrile as a polymerization initiator were mixed to give 201 g of a monomer mixed solution.

Next, in a polymerization vessel equipped with a stirrer and a thermometer, 800 g of the aqueous surfactant solution was placed, and then 201 g of the monomer mixed solution was placed in the polymerization vessel. The contents in the polymerization vessel were then stirred with a high-speed emulsifier/disperser "T. K. HOMO MIXER" manufactured by PRIMIX Corporation to give a dispersion liquid.

Furthermore, 60 g of the emulsion containing the seed particles was added to the dispersion liquid, and the mixture was stirred at 30° C. for 1 hour. This allowed the seed particles to absorb the monomer mixture. Next, the allowed monomer mixture was warmed at 50° C. for 5 hours under a stream of nitrogen to be polymerized, and then was cooled to room temperature (about 25° C.). This yielded a slurry containing resin particles.

The obtained slurry was passed through a stainless-steel wire mesh having an opening of 20 µm to classify the resin particles, and thus a slurry containing the classified resin particles was obtained.

The resin particles contained in the obtained slurry had a volume average particle diameter D1 of 1.2 µm, and the resin particles contained in the obtained slurry had a variation coefficient of particle diameter of 12.3%.

(Production of Resin Particle Aggregate)

To the slurry containing resin particles, 50 g of "SNOWTEX O-40" (manufactured by Nissan Chemical Industries, Ltd.; a solid content of 40% as colloidal silica (inorganic powder), a particle diameter of 0.02 to 0.03 µm) was added, and the mixture was stirred with a high-speed emulsifier/disperser "T. K. HOMO MIXER" manufactured by PRIMIX Corporation for 10 minutes. The obtained slurry had a solid concentration of 21% by mass.

The obtained slurry was spray-dried with a spray dryer (Type: atomizer system and take-up system, Model: TRS-3WK) manufactured by Sakamotogiken Co., LTD. as a spray drying apparatus in a condition of a slurry supply speed of 25 ml/min, an atomizer rotation speed of 11,000 rpm, an air flow of 2 m$^3$/min, an inlet temperature (temperature of a slurry inlet) of 130° C., and an outlet temperature (temperature of a powder outlet) of 70° C., thereby yielding a resin particle aggregate.

The obtained resin particle aggregate had an estimate value of refractive index of 1.48. The obtained resin particle aggregate had a volume average particle diameter D3 of 51 µm. The obtained resin particle aggregate contained an inorganic component in an amount of 8.7% by mass.

Subsequently, the evaluation values of the resin particle aggregate were determined in order to evaluate the dispersibility of the resin particle aggregate. As a result, the particles contained in the resin particle aggregate dispersion liquid had a volume average particle diameter D2 of 30 µm, the ratio D2/D1 of the volume average particle diameter D2 of the particles contained, in the resin particle aggregate dispersion liquid with respect to the volume average particle diameter D1 of the resin particles was 2.7, and the ratio of particles having a particle diameter larger than the volume average particle diameter D3 (=51 µm) of the resin particle aggregate with respect to the particles contained in the resin particle aggregate dispersion liquid was 0.0% by volume. As a result of the observation of the obtained resin particle aggregate under SEM, the resin particle aggregate maintained a spherical shape, and no connection among resin particles by the fusion of the resin particles was observed.

(Production of Molded Article)

Into an extruder, 100 parts by mass of polystyrene ("TOYO STYROL (registered trademark) GP G200C" manufactured by TOYO STYRENE Co., Ltd.) as a transparent base resin and 1 part by mass of the resin particle aggregate were supplied, and then the whole was melted and kneaded at 230° C. in the extruder and then was pelletized. No deposit was observed during the pelletization. The obtained pellets were molded with an injection molding machine in a condition of a cylinder temperature of 230° C. and a residence time of 10 minutes, thus yielding a plate-like molded article having a thickness of 2 mm, a width of 50 mm, and a length of 100 mm as a molded article made of the light diffusible resin composition. The obtained molded article had a total light transmittance of 60%, and the obtained molded article had a haze of 99%.

Table 1 summarizes the formulation of the second vinyl monomer included in the resin particles, the volume average particle diameter D1 and the variation coefficient of the particle diameter of the resin particles, the volume average particle diameter D3 of the resin particle aggregate, the volume average particle diameter D2 of the particles contained in the resin particle aggregate dispersion liquid, the ratio D2/D1, the dispersibility evaluation value (the ratio of particles having a particle diameter larger than the volume average particle diameter D3 of the resin particle aggregate with respect to the particles contained in the resin particle aggregate dispersion liquid), the formulation of the molded article (the type and the amount of the base resin), and the total light transmittance and the haze of the molded article, in Examples 1 to 6 and Comparative Examples 1 to 4.

TABLE 1

| | Resin particle | | | Resin particle aggregate | | | | Molded article | | | |
|---|---|---|---|---|---|---|---|---|---|---|---|
| | Formulation of second vinyl monomer (mass ratio) | Volume average particle diameter D1 (μm) | Variation coefficient of particle diameter (%) | Volume average particle diameter D2 (μm) of particles dispersed in water | D2/D1 | Volume average particle diameter D3 (μm) | Ratio of particles larger than D3 for dispersibility evaluation (% by mass) | Transparent base resin | Amount of resin particle aggregate (parts by mass relative to 100 parts by mass of transparent base resin) | Total light transmittance (%) | Haze % |
| Example 1 | BA/EDMA = 70/30 | 1.1 | 12.5 | 6.5 | 5.9 | 52 | 0.0 | Polystyrene | 1 | 65 | 99 |
| Example 2 | BMA/EDMA = 60/40 | 1.2 | 17.3 | 5.7 | 4.8 | 55 | 0.0 | Polystyrene | 1 | 67 | 99 |
| Example 3 | ST/EDMA = 90/10 | 1.2 | 11.3 | 6.3 | 5.3 | 53 | 0.0 | PMMA | 1 | 66 | 99 |
| Example 4 | ST/DVB = 90/10 | 1.1 | 13.7 | 5.8 | 5.3 | 52 | 0.0 | PMMA | 1 | 65 | 99 |
| Example 5 | BA/EDMA = 60/40 | 0.86 | 14.1 | 5.7 | 6.6 | 52 | 0.0 | Polystyrene | 1 | 63 | 99 |
| Example 6 | MMA/EDMA = 80/20 | 0.62 | 17.9 | 6.6 | 10.6 | 50 | 0.0 | Polycarbonate | 1 | 63 | 99 |
| Comparative Example 1 | BA/EDMA = 95/5 | 1.2 | 12.0 | 34 | 28.3 | 52 | 18.2 | Polystyrene | 1 | 68 | 98 |
| Comparative Example 2 | BA/EDMA = 70/30 | 1.1 | 11.1 | 35 | 31.8 | 54 | 20.8 | Polystyrene | 1 | 69 | 98 |
| Comparative Example 3 | ST/DVB = 40/60 | Not determined due to assembling | — | — | — | — | — | — | — | — | — |
| Comparative Example 4 | BA/EDMA = 80/20 | 1.2 | 12.3 | 30 | 2.7 | 51 | 0.0 | Polystyrene | 1 | 60 | 99 |

In Table above, BA is butyl acrylate, EDMA is ethylene glycol dimethacrylate, BMA is butyl methacrylate, ST is styrene, DVB is divinylbenzene, MMA is methyl methacrylate, and PMMA is polymethyl methacrylate.

As shown in Table above, the resin particle aggregates of Examples 1 to 6 of the present invention had a ratio D2/D1 of 15 or less and a dispersibility evaluation value of 1% by mass or less, which suggest that the resin particle aggregate readily disperses into primary particles or a similar state, unlike the resin particle aggregate of Comparative Example 1 in which the resin particles were cross-linked by a cross-linkable monomer in an amount of less than 9% by mass and the resin particle aggregate of Comparative Example 3 in which the resin particles were cross-linked by a cross-linkable monomer in an amount of more than 50% by mass. The results also revealed that the resin particle aggregates of Examples 1 to 6 of the present invention readily dispersed into primary particles or a similar state and thus imparted good light diffusion properties (haze) when added to a light diffusible composition (molded article).

Table above also revealed that when added to a light diffusible composition (molded article), the resin particle aggregates of Examples 1 to 6 of the present invention imparted better optical transparency (total light transmittance) than that by the resin particle aggregate of Comparative Example 2 containing an inorganic component in an amount of more than 0.5% by mass.

Example 7

Production Example of Composition for Coating

With a mixing and degassing apparatus "THINKY MIXER (registered trademark)" manufactured by THINKY, 25 parts by mass of the particle aggregate obtained in Example 1, 100 parts by mass of a commercially available alkyd resin (an oil-free alkyd resin manufactured by DIC Corporation, trade name "BECKOLITE (registered trademark) M-6402-50") (a solvent content of 50% by mass) as a binder resin, 30 parts by mass of xylene as a solvent, and 5 parts by mass of carbon black as a color pigment were stirred (mixed) for 10 minutes and subsequently degassed for 1 minute, thereby yielding a coating material composition as one of the composition for coating. With a coating apparatus equipped with a blade having a clearance of 100 μm, the obtained coating material composition was applied onto a polyester film and then dried to yield a coating film.

Example 8

Production Example of Optical Film

First, 250 parts by mass of the resin particle aggregate produced in Example 1, 180 parts by mass of ACRYDIC (pending trademark) A-801-P (acrylic polyol; manufactured by DIC Corporation, a solid content of 50% by mass, a hydroxy value of 50 mg KOH/g), 50 parts by mass of TAKENATE D110N (polyisocyanate; manufactured by Mitsui Chemicals, Inc., a solid content of 60% by mass) as binder resins, 300 parts by mass of toluene, and 330 parts by mass of methyl ethyl ketone (MEK) as solvents were mixed to give a light diffusible ink as a composition for coating.

Next, a PET (polyethylene terephthalate) film having a thickness of 100 μm was coated with the light diffusible ink by die coating, thereby yielding a light diffusion film having a light diffusion layer (the layer formed by curing the light diffusible ink) with a thickness of 12 μm as an optical film.

Example 9

Production Example of Optical Film

First, 100 parts by mass of a mixture of pentaerythritol triacrylate and pentaerythritol tetraacrylate (KAYARAD PET-30, manufactured by Nippon Kayaku Co., Ltd.) as a binder resin, 15 parts by mass of the resin particle aggregate produced in Example 1, 6 parts by mass of an ultraviolet polymerization initiator (manufactured by Ciba Specialty Chemicals, Irgacure 184), and 140 parts by mass of toluene as a solvent were mixed to give a mixture. The mixture was dispersed with a sand mill for 30 minutes to give a composition for forming a light diffusion layer as a composition for coating. Onto one face of a TAC (triacetyl cellulose) film having a thickness of 80 μm, the composition for forming a light diffusion layer was applied by gravure reverse coating and was dried at 100° C. for 2 minutes. Then, the coating film was irradiated with ultraviolet light with a 120-W/cm concentrated high pressure mercury lamp to be cured, thereby yielding an antiglare film having a light diffusion layer (the layer formed by curing the composition for forming a light diffusion layer) with a thickness of 6 μm as an optical film.

Example 10

Production Example of External Preparation

In Example, a powder foundation including a powder part and an oil part was produced. In other words, first, 21 g of the particle aggregate obtained in Example 1, 38 g of talc as clay minerals, 22 g of mica as clay minerals, 6 g of titanium oxide as a color material, 0.6 g of red iron oxide as a color material, 1 g of yellow iron oxide as a color material, and 0.1 g of black iron oxide as a color material were mixed with a Henschel Mixer to give the powder part. Separately, 1.0 g of cetyl 2-ethylhexanoate as a fatty acid ester, 1 g of sorbitan sesquioleate as a surfactant, and 0.2 g of an antiseptic agent were mixed and dissolved to give the oil part (except perfumes).

Next, the oil part (except perfumes) was added to and mixed with the powder part to make a homogeneous mixture. 0.1 g of a perfume was added to and mixed with the obtained mixture, and then the obtained mixture was pulverized and sieved. The sieved mixture was compression-molded to yield a powder foundation as an external preparation.

The invention claimed is:

1. A resin particle aggregate formed by aggregating a plurality of resin particles including a polymer of a vinyl monomer, the resin particle aggregate comprising:
    100 parts by mass of the resin particles; and
    1 to 5 parts by mass of a surfactant;
    the resin particles being cross-linked by a cross-linkable monomer in an amount of 9 to 50% by mass relative to the total mass of the resin particles,
    the resin particle aggregate containing an inorganic component in an amount of 0.5% by mass or less,
    the resin particles having a volume average particle diameter D1, particles contained in a dispersion liquid of the resin particle aggregate in water having a volume average particle diameter D2, the ratio of D2/D1 being 15 or less,
    the volume average particle diameter D2 being determined by mixing 0.50 g of the resin particle aggregate and 50 g of water, sonicating the mixture for 10 minutes with an ultrasonic disperser at an output power of 400 W and a frequency of 20 kHz to give a dispersion liquid, and then determining the volume average particle diameter of the particles contained in the dispersion liquid with a laser diffraction scattering particle size distribution analyzer by a method of calculating the volume average particle diameter of the particles with an optical model corresponding to a refractive index of the resin particles.

2. The resin particle aggregate according to claim 1, wherein the ratio of particles having a particle diameter larger than a volume average particle diameter D3 of the resin particle aggregate with respect to the particles contained in the dispersion liquid of the resin particle aggregate in water is 1% by volume or less, and
    wherein the ratio is determined by mixing 0.50 g of the resin particle aggregate and 50 g of water, sonicating the mixture for 10 minutes with an ultrasonic disperser at an output power of 400 W and a frequency of 20 kHz to give a dispersion liquid, then determining a volumetric particle size distribution of the particles contained in the dispersion liquid with a laser diffraction scattering particle size distribution analyzer by a method of calculating the volume average particle diameter of particles with an optical model corresponding to a refractive index of the resin particles, and calculating the ratio from the determined volumetric particle size distribution and the volume average particle diameter D3 of the resin particle aggregate.

3. The resin particle aggregate according to claim 1, wherein the vinyl monomer is at least one monomer selected from the group consisting of a styrenic monomer and an alkyl(meth)acrylate monomer.

4. The resin particle aggregate according to claim 1, wherein the cross-linkable monomer is at least one monomer selected from the group consisting of divinylbenzene, ethylene glycol di(meth)acrylate, and trimethylolpropane tri (meth)acrylate.

5. The resin particle aggregate according to claim 1, obtained by a seed polymerization method of allowing seed particles including a polymer of a first vinyl monomer to absorb a second vinyl monomer and polymerizing the second vinyl monomer.

6. The resin particle aggregate according to claim 5, wherein the ratio of the seed particles with respect to the total mass of the resin particles is 10% by mass or less.

7. The resin particle aggregate according to claim 1, wherein the resin particles have a volume average particle diameter of 0.1 to 2.0 μm, and wherein the resin particles have a variation coefficient of particle diameter of 20% or less.

8. A method for producing the resin particle aggregate according to claim 1, the method comprising:
    a seed polymerization step by a seed polymerization method of allowing seed particles including a polymer of a first vinyl monomer to absorb a second vinyl monomer and polymerizing the second vinyl monomer to give resin particles; and
    a spray drying step of spray drying a slurry containing 100 parts by mass of the obtained resin particles, 1 to 5 parts by mass of a surfactant, and an aqueous medium with a spray dryer equipped with a slurry inlet and a powder outlet, the slurry being sprayed and introduced through the slurry inlet, the resin particle aggregate being discharged through the powder outlet, in a condition of a slurry inlet temperature ranging from 80° C. to 220° C. and a powder outlet temperature ranging from 40° C. to 100° C., no water-soluble polymer being used during the polymerization of the second vinyl monomer, the resin particles containing 9 to 50% by mass of a cross-linkable monomer relative to 100% by mass of the resin particles, the slurry having a solid concentration ranging from 24 to 40% by mass.

9. The method for producing a resin particle aggregate according to claim 8, wherein after the seed polymerization step, the resin particles are classified, and the classified resin particles are subjected to the spray drying step.

10. The method for producing a resin particle aggregate according to claim 8, wherein the slurry contains an inorganic component in an amount of 0.5% by mass or less relative to the total mass of the resin particles.

11. A light diffusible resin composition formed by mixing a transparent base resin and the resin particle aggregate according to claim 1.

12. A composition for coating formed by compounding the resin particle aggregate according to claim 1.

13. An optical film obtained by coating a substrate film with the composition for coating according to claim 12.

14. An external preparation formed by compounding the resin particle aggregate according to claim 1.

* * * * *